United States Patent
Mukai et al.

(10) Patent No.: US 9,213,678 B2
(45) Date of Patent: Dec. 15, 2015

(54) TRANSFER FUNCTION ESTIMATION APPARATUS, METHOD AND PROGRAM

(71) Applicants: DENSO CORPORATION, Kariya, Aichi-pref. (JP); NATIONAL UNIVERSITY CORPORATION NAGOYA INSTITUTE OF TECHNOLOGY, Nagoya-shi, Aichi (JP)

(72) Inventors: Yasuhiko Mukai, Anjo (JP); Yoshifumi Morita, Gifu (JP); Hiroyuki Ukai, Nagoya (JP); Makoto Iwasaki, Nagoya (JP); Hiroyasu Otake, Gamagori (JP); Ryo Kano, Nagoya (JP)

(73) Assignees: DENSO CORPORATION, Kariya (JP); NATIONAL UNIVERSITY CORPORATION NAGOYA INSTITUTE OF TECHNOLOGY, Nagoya-shi (JP)

( * ) Notice: Subject to any disclaimer, the term of this patent is extended or adjusted under 35 U.S.C. 154(b) by 223 days.

(21) Appl. No.: 13/939,760

(22) Filed: Jul. 11, 2013

(65) Prior Publication Data
US 2014/0019505 A1 Jan. 16, 2014

(30) Foreign Application Priority Data
Jul. 13, 2012 (JP) ................. 2012-157692

(51) Int. Cl.
*G06F 17/10* (2006.01)
*G01H 1/00* (2006.01)

(52) U.S. Cl.
CPC . *G06F 17/10* (2013.01); *G01H 1/00* (2013.01)

(58) Field of Classification Search
None
See application file for complete search history.

(56) References Cited

U.S. PATENT DOCUMENTS

| 5,732,373 | A | 3/1998 | Endo |
| 6,307,877 | B1 * | 10/2001 | Philips et al. ................. 375/130 |
| 7,421,036 | B2 * | 9/2008 | Sorrells et al. ................ 375/294 |
| 2008/0189064 | A1 * | 8/2008 | Yamaguchi et al. ............ 702/69 |

* cited by examiner

*Primary Examiner* — Michael D Yaary
(74) *Attorney, Agent, or Firm* — Nixon & Vanderhye P.C.

(57) ABSTRACT

An apparatus for estimating a transfer function of at target object having divided systems is disclosed. The apparatus acquires an estimation equation to estimate the transfer function of the target object, and determines, for each arithmetic operation in the estimation equation, whether the arithmetic operation is an addition or a multiplication. For the multiplication, the apparatus performs the multiplication of frequency response characteristics in the frequency domain. For addition, the apparatus converts the frequency response characteristics into time response characteristics, performs the addition of the time response characteristics in the time domain, and reconverts a result of the addition into the frequency domain.

8 Claims, 24 Drawing Sheets

TRANSFER FUNCTION ESTIMATION APPARATUS, METHOD AND PROGRAM

CROSS REFERENCE TO RELATED APPLICATION

The present application is based on and claims priority to Japanese Patent Applications No. 2012-157692 filed on Jul. 13, 2012, disclosure of which is incorporated herein by reference.

TECHNICAL FIELD

The present invention relates to a transfer function estimation apparatus, a transfer function estimation method, and a transfer function estimation program.

BACKGROUND

It is known that a measurement target object is divided in multiple divided systems and a transfer function of the measurement target object as a whole is estimated from transfer functions of the divided systems. The measurement target object as a whole is also referred to herein as a whole system.

When a measurement target object is, for example, a complicated apparatus, there are many resonance components or anti-resonance components in a frequency response characteristic associated with acceleration in response to input of a certain force. When there are many resonance components or anti-resonance components, a processing load (arithmetic operation load) for calculating a transfer function of a divided system by curve fitting or the like is excessively large, and a result, it becomes impossible to calculate the transfer function of the divided system in some cases. In a conventional transfer function synthesis method, when it is impossible to calculate the transfer function of the divided system, it is impossible to estimate the transfer function of the whole system. If the curve fitting is performed by using only a part of the resonance components or the anti-resonance components in order to calculate the transfer function of the divided system, information other than the used frequency components is missing. Thus, the estimation of the transfer function of the whole system by calculating the transfer function of the divided system has a low estimation precision by the missing information.

SUMMARY

The present disclosure is made in view of the foregoing. It is an object of the present disclosure to provide a transfer function estimation apparatus, a transfer function estimation method, and a transfer function estimation program that can reduce a processing load and can perform high precision arithmetic operations on a transfer function of a whole system.

According to a first aspect, a transfer function estimation apparatus estimates a transfer function of a measurement target object having a plurality of divided systems. The transfer function estimation apparatus comprises an estimation equation acquisition section, a frequency response characteristic acquisition section, a four arithmetic operation determination section, a multiplication-division section, a conversion section, an addition-subtraction section and a reconversion section.

The estimation equation acquisition section acquires an estimation equation to estimate the transfer function of the measurement target object, where the transfer function of the measurement target object is determined in accordance with the number of divided systems of the measurement target object and a connection form of the divided systems of the measurement target object. The frequency response characteristic acquisition section acquires frequency response characteristics which are data in a frequency domain and which include gain and phase associated with input to and output from the measurement target object.

The four arithmetic operation determination section determines, for each arithmetic operation in the estimation equation, whether the arithmetic operation is an addition-subtraction or a multiplication-division.

When the four arithmetic operation determination section determines that the arithmetic operation is the multiplication-division, the multiplication-division section performs the multiplication-division of the frequency response characteristics in the frequency domain.

When the four arithmetic operation determination section determines that the arithmetic operation is the addition-subtraction, the conversion section converts the frequency response characteristics, which are targeted for the addition-subtraction, into time response characteristics to thereby calculate the time response characteristics, which are data in a time domain. The addition-subtraction section performs the addition-subtraction of the time response characteristics in the time domain. Thereafter, the reconversion section reconverts a result of the addition-subtraction performed by the addition-subtraction section into the frequency domain.

In the above transfer function estimation apparatus, the frequency response characteristics are used in the arithmetic operations in the estimation equation for estimating the transfer function of a whole system of the measurement target object. Since the multiplication-division of frequency response characteristics can be performed in the frequency domain, the multiplication-division of frequency response characteristics is performed in the frequency domain. By contrast, since the addition-subtraction of frequency response characteristics in the frequency domain is difficult, the frequency response characteristics are converted into the time domain to perform the arithmetic operation in the time domain. In this way, without calculating the transfer functions of the divided systems of the measurement target object, it is possible to perform the arithmetic operations in the estimation equation. Since it is unnecessary to calculate transfer functions of the divided systems, it becomes possible to reduce a processing load. Moreover, since the frequency response characteristics of the measurement target object are used without change, it is possible to highly accurately estimate the transfer function of the whole system as compared with cases where the curve-fitting is performed by using only a part of the resonance components. Accordingly, it becomes possible to perform high accuracy vibration or sound simulation.

In the present disclosure, "frequency response characteristic" used in the arithmetic operation by the multiplication-division section includes a result of the multiplication-division in the frequency domain. Additionally, "frequency response characteristic" converted into the time domain by the conversion section to be used in the arithmetic operation by the addition-subtraction section includes a result of the reconverting into the frequency domain after the addition-subtraction in the time domain.

According to a second aspect, a transfer function estimation method for estimating a transfer function of a measurement target object having a plurality of divided systems is provided. The transfer function estimation method comprises: acquiring an estimation equation to estimate the transfer function of the measurement target object, the transfer function being determined in accordance with the number of divided systems of the measurement target object and a connection manner of the divided systems of the measurement target object; acquiring frequency response characteristics which are data in a frequency domain and which include gain and phase associated with input to and output from the measurement target object; determining, for each arithmetic operation in the estimation equation, whether the arithmetic operation is an addition-subtraction or a multiplication-division; in cases where it is determined that the arithmetic operation is the multiplication-division, performing the multiplication-division of the frequency response characteristics in the frequency domain; in cases where it is determined that the arithmetic operation is the addition-subtraction, converting the frequency response characteristics, which are targeted for the addition-subtraction, into time response characteristics, thereby calculating the time response characteristics, which are data in a time domain; performing the addition-subtraction of the time response characteristics in the time domain; and reconverting a result of the addition-subtraction into the frequency domain.

According to a third aspect, a non-transitory computer readable storage medium storing a computer-executable program that causes a computer to execute the above transfer function estimation method.

The above transfer function estimation method and the non-transitory computer readable storage medium can involves substantially the same advantages as the above transfer function estimation apparatus.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

A transfer function estimation apparatus, a transfer function estimation method and a program of embodiments will be described with reference to the drawings.

(First Embodiment)

Figure 1:
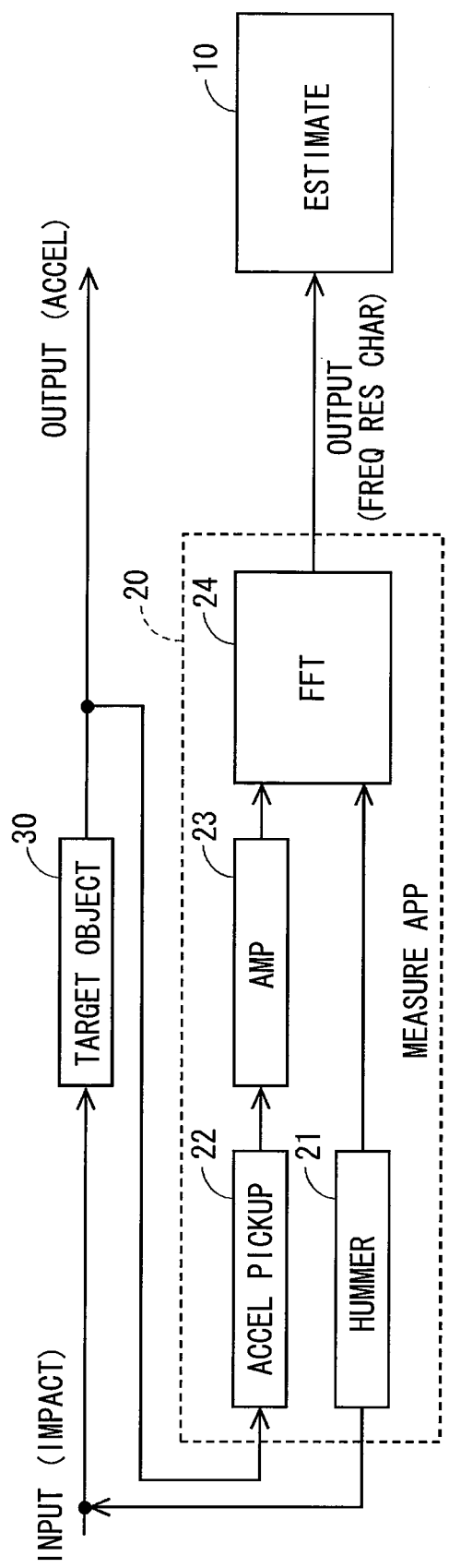
FIG. 1 is block diagram illustrating a transfer function estimation apparatus of a first embodiment.

As shown in FIG. 1, a transfer function estimation apparatus 10 of the present embodiment estimates a transfer function of a measurement target object 30 and is configured to acquire various data from a measurement apparatus 20. In the present embodiment, obtaining a vibration characteristic of the measurement target object 30 will be illustrated. The measurement apparatus 20 includes an impulse hammer 21, an acceleration pickup 22, a charge amplifier 23 and an FFT analyzer 24.

Figure 2:
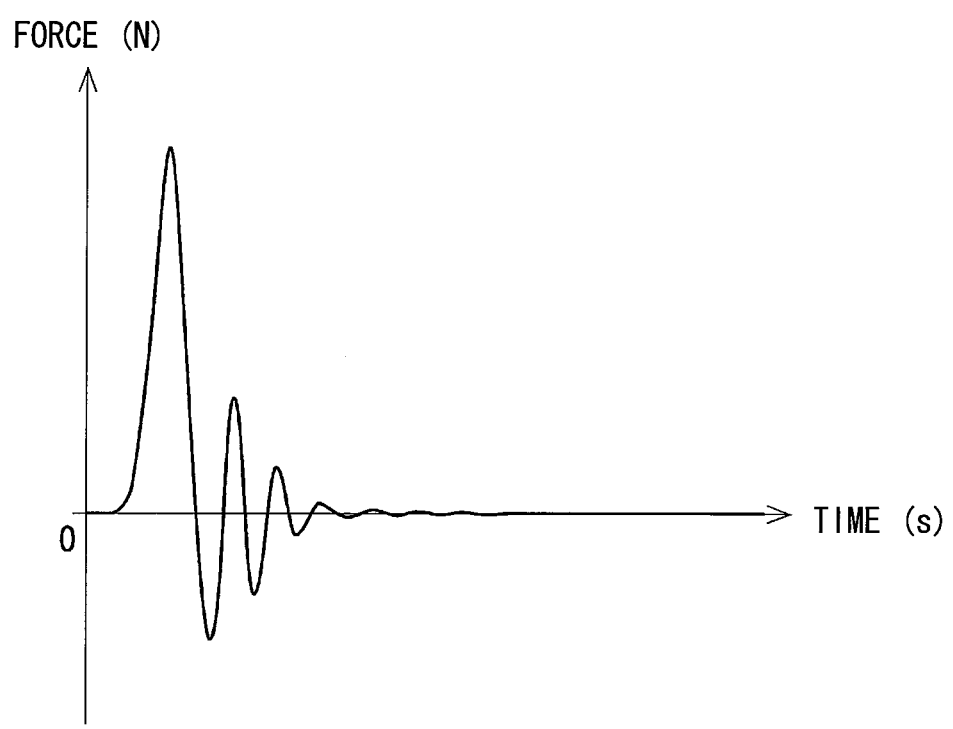
FIG. 2 is a diagram illustrating a force inputted to a measurement target object of the first embodiment.
Figure 3:
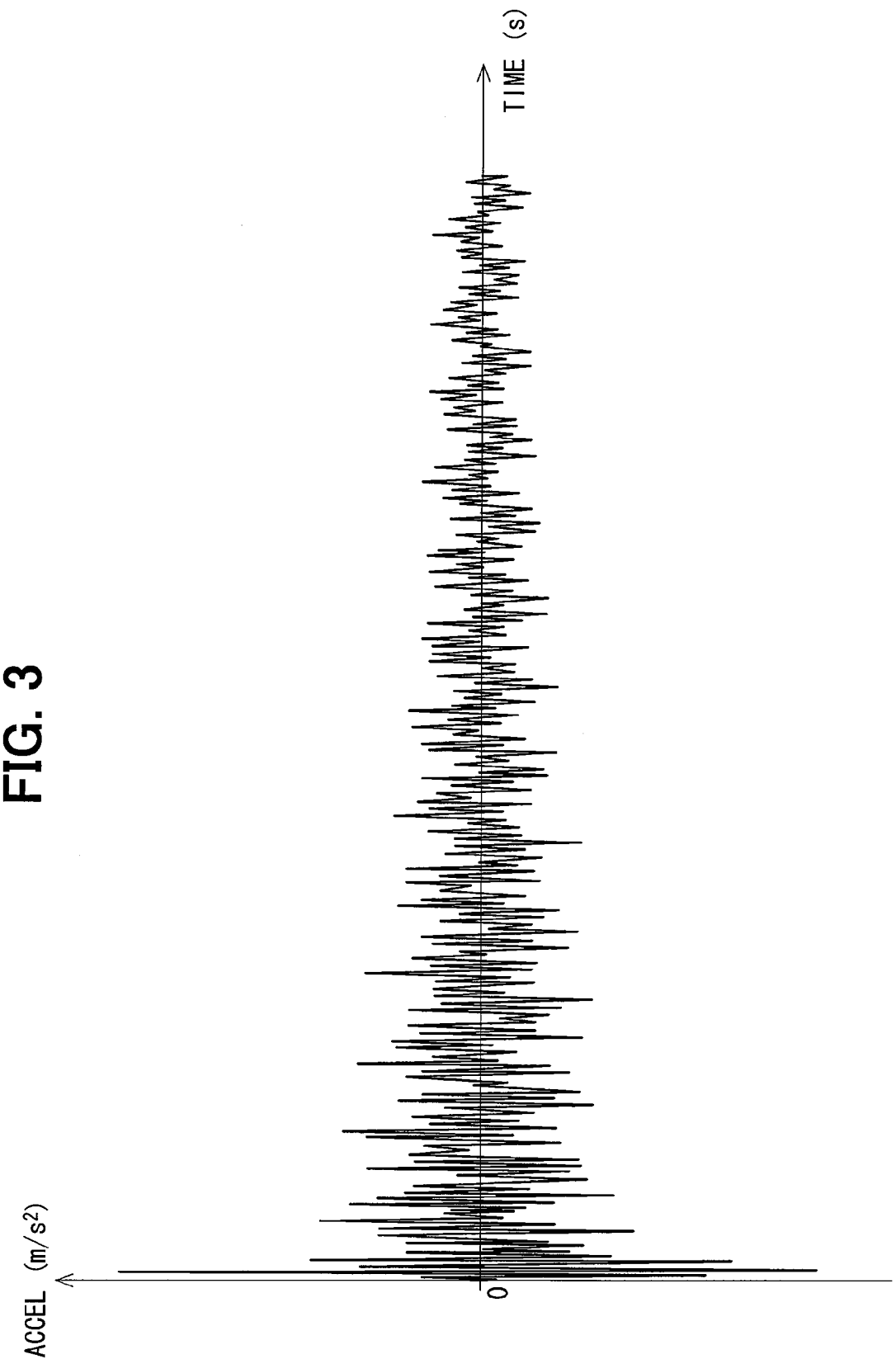
FIG. 3 is a diagram illustrating acceleration outputted from the measurement target object of the first embodiment.

The impulse hammer 21 inputs an impact force to an input point $P_1$ of the measurement target object 30. The inputted impact force (see FIG. 2) is acquired by the FFT analyzer 24. The acceleration pickup 22 acquires acceleration data, which is associated with the force that is inputted to the input point $P_1$ of the measurement target object 30 and outputted from an output point $P_4$. An acceleration signal acquired by the acceleration pickup 22 is amplified by the charge amplifier 23. The amplified acceleration data is, for example, such one as illustrated in FIG. 3. In the FFT analyzer 24, the amplified acceleration data is converted into data in frequency domain by fast Fourier transform (FFT). The frequency response characteristic $G_{mn}$, which is the data in frequency domain, is matrix data that is associated, on a predetermined frequency basis (e.g., 1 Hz basis), with frequency $f_i$, gain $G(f_i)$ and phase ∠G($f_i$). The frequency response characteristic $G_{mn}$ calculated by the FFT analyzer 24 is outputted to the transfer function estimation apparatus 10.

Figure 4A:
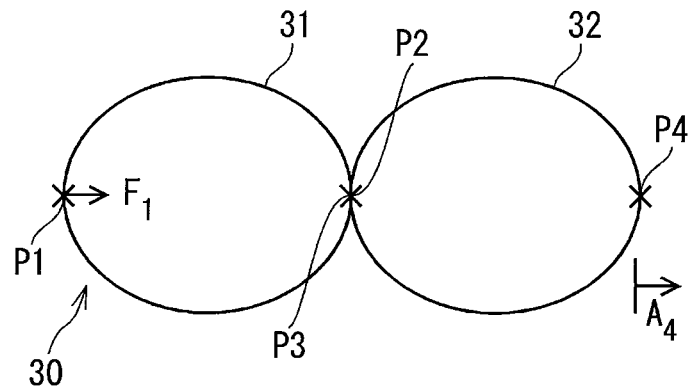
FIGS. 4A-4C are diagrams illustrating the measurement target object of the first embodiment.
Figure 4B:
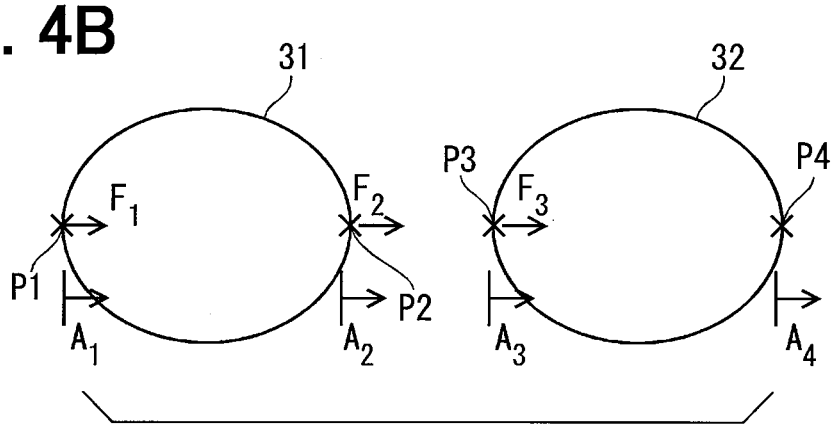
Figure 4C:
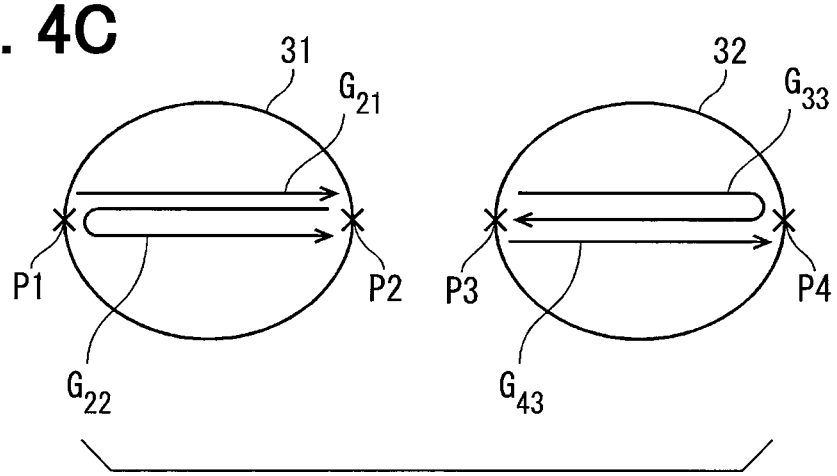

As shown in FIGS. 4A to 4C, the measurement target object 30 of the present embodiment is constructed by two divided systems 31, 32, which are a first divided system 31 and a second divided system 32. The first divided system 31 has an input point $P_1$ and an output point $P_2$. The second divided system 32 has an input point $P_3$ and an output point $P_4$. The output point $P_2$ of the first divided system 31 is connected to the input point $P_3$ of the second divided system 32 by rigid connection. Because of this, the force $F_1$ inputted to the input point $P_1$ of the first divided system 31 is transmitted to the first divided system 31 and the second divided system 32, and is outputted from the output point $P_4$ as acceleration $A_4$. The output point P2 of the first divided system 31 and the input point $P_3$ of the second divided system 32 correspond to a node.

Here, an estimation equation for estimating a transfer function $H_{41\_sim}$ of the whole system of the measurement target object 30 will be illustrated with reference to FIGS. 4A to 4C. In the bellow: a force applied to a point $P_n$ is denoted by $F_n$; an acceleration of the point $P_n$ is denoted by $A_n$; and a transfer function from the force applied to $P_n$ to acceleration of $P_m$ is denoted by $H_{mn}$.

The accelerations $A_1$ to $A_4$ of the points $P_1$ to $P_4$ are expressed in the following Eqs. (1) to (4), respectively.

$$A_1 = H_{11}F_1 + H_{12}F_2 \quad (1)$$

$$A_2 = H_{21}F_1 + H_{22}F_2 \quad (2)$$

$$A_3 = H_{33}F_3 \quad (3)$$

$$A_4 = H_{43}F_3 \quad (4)$$

In the present embodiment, since the output point $P_2$ of the first divided system 31 and the input point $P_3$ of the second divided system 32 are connected by rigid connection, the following equation is satisfied.

$$A_2 = A_3 \quad (5)$$

Additionally, from equilibrium of internal forces, the following equation is satisfied.

$$F_2 + F_3 = 0 \quad (6)$$

By solving the above system of equations (1) to (6), the estimation equation $H_{41\_sim}$ for estimating the transfer function of the whole system of the measurement target object 30 is expressed as follows.

$$\frac{A_4}{F_1} = \frac{H_{21} \cdot H_{43}}{H_{22} + H_{33}} \equiv H_{41\_sim} \quad (7)$$

Since the estimation equation for estimating the transfer function of the whole system is derivable in accordance with the number of divided systems and the connection form of divided systems, the estimation equation for the measurement target object 30 is prestored in the transfer function estimation apparatus 10.

As shown in Eq. (7), in order to calculate the transfer function $H_{41}$ from the force $F_1$ inputted to the input point $P_1$ to the acceleration of the output point $P_4$, the transfer functions $H_{21}, H_{22}, H_{33}, H_{43}$ are required as the transfer functions of the divided systems. Accordingly, in the present embodiment, the measurement apparatus 20 illustrated in FIG. 1 is used to acquire the frequency response characteristics $G_{21}, G_{22}, G_{33}$, $G_{43}$ associated with the transfer functions $H_{21}, H_{22}, H_{33}, H_{43}$. This example uses the measurement apparatus 20 to acquire the frequency response characteristics $G_{21}, G_{22}, G_{33}, G_{43}$. Alternatively, a finite element method may be used for the transfer function estimation apparatus 10 to internally acquire the frequency response characteristics $G_{21}, G_{22}, G_{33}, G_{43}$.

Figure 5:
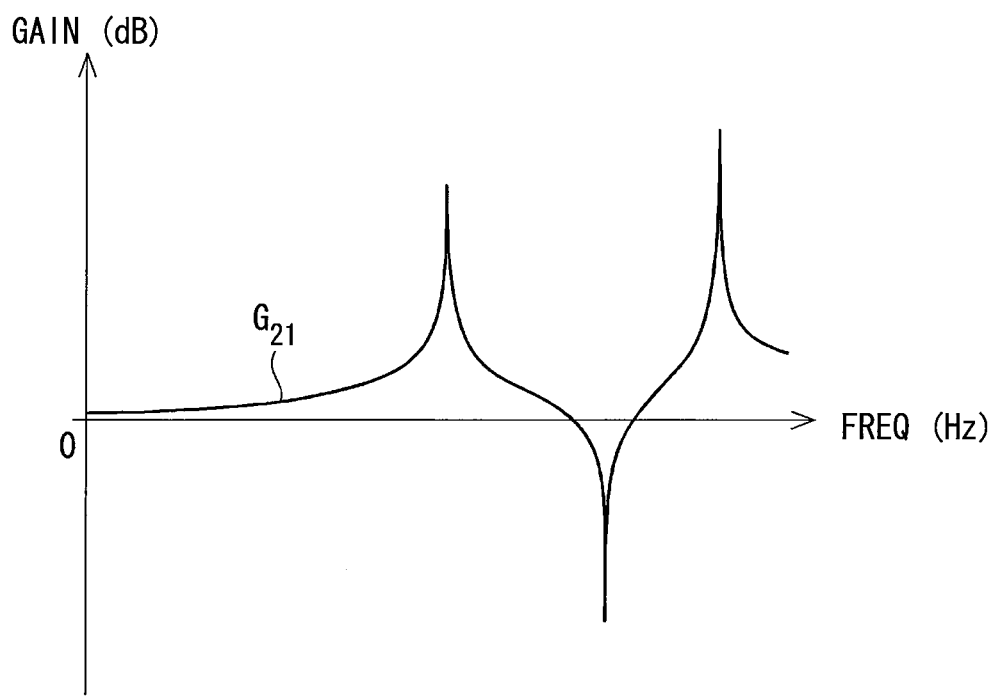
FIG. 5 is a diagram illustrating a frequency response characteristic $G_{21}$ of the first embodiment.
Figure 6:
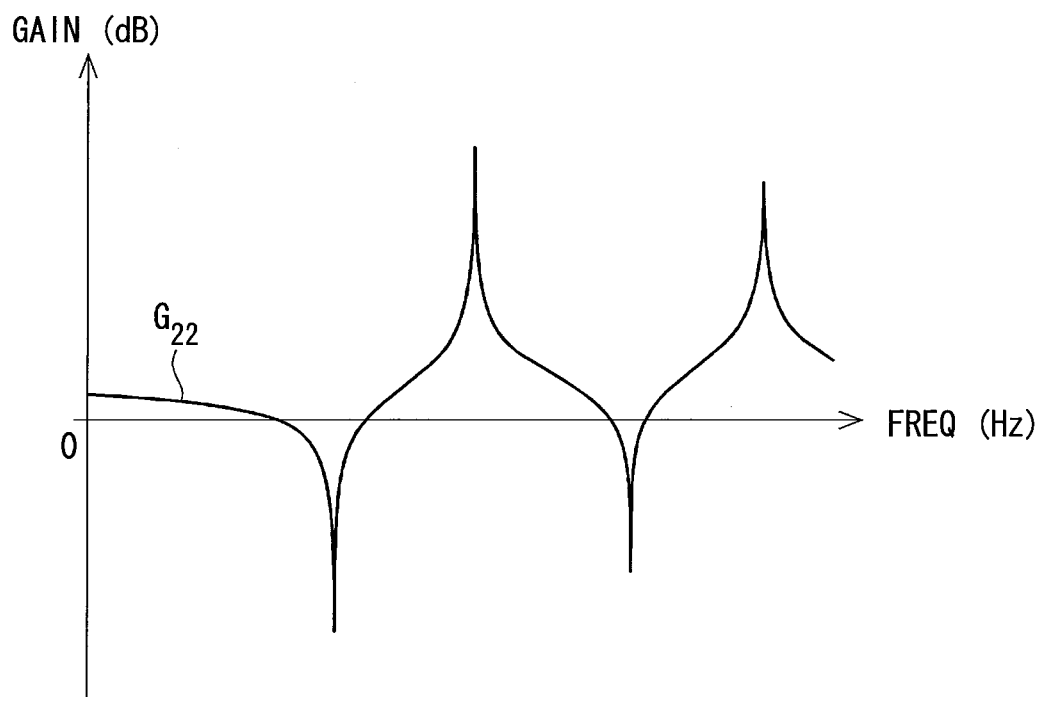
FIG. 6 is a diagram illustrating a frequency response characteristic $G_{22}$ of the first embodiment.
Figure 7:
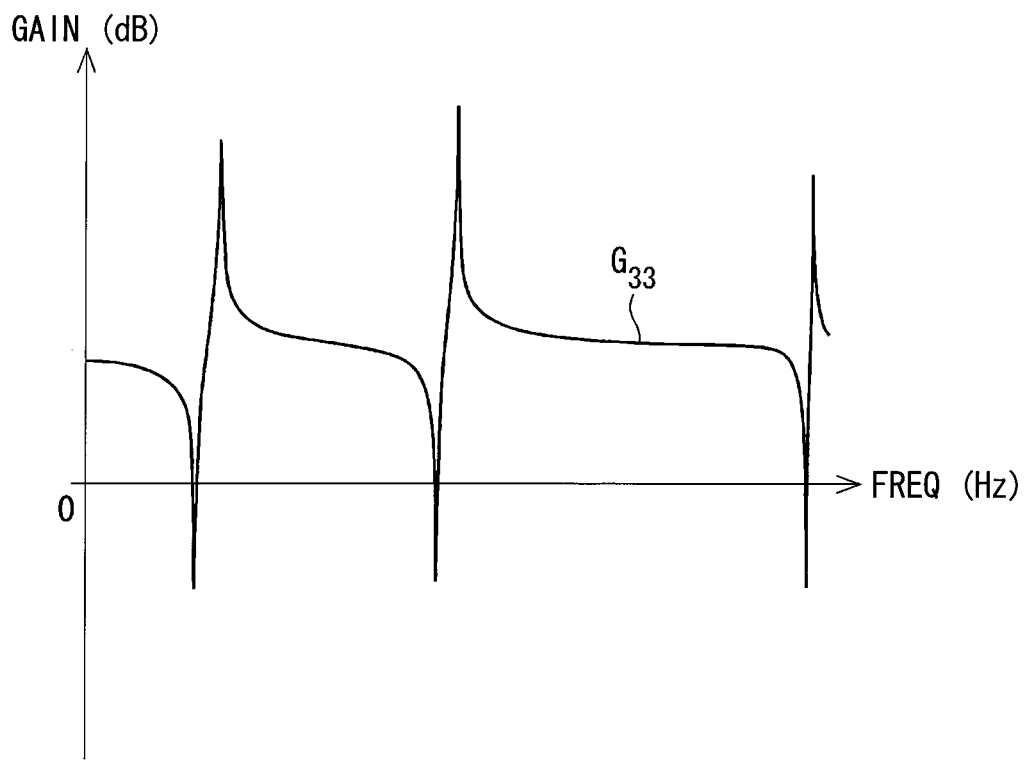
FIG. 7 is a diagram illustrating a frequency response characteristic $G_{33}$ of the first embodiment.
Figure 8:
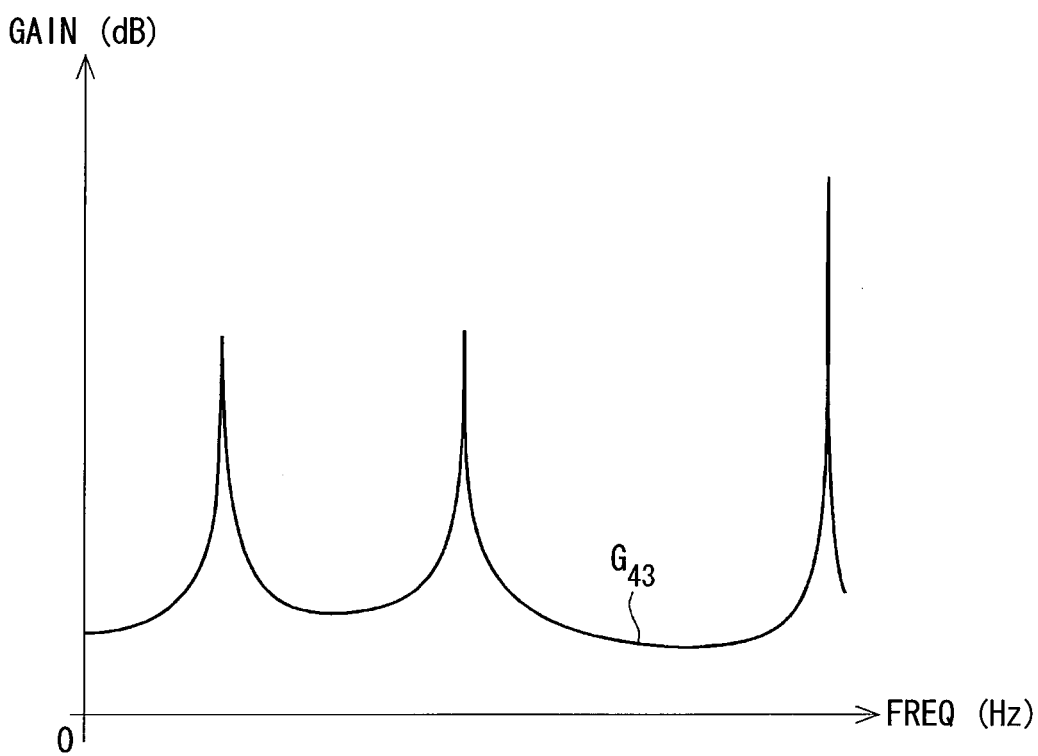
FIG. 8 is a diagram illustrating a frequency response characteristic $G_{43}$ of the first embodiment.

As shown in FIG. 4C, the acceleration $A_2$ of the output point $P_2$ in response to application of a certain force to the input point $P_1$ is acquired, and the frequency response characteristic $G_{21}$ FFT-converted in the FFT analyzer 24 is acquired (see FIG. 5). Additionally, the acceleration $A_2$ of the output point $P_2$ in response to application of a certain force to the output point $P_2$ is acquired, and the frequency response characteristic $G_{22}$ FFT converted in the FFT analyzer 24 is acquired (see FIG. 6). Additionally, the acceleration $A_3$ of the input point $P_3$ in response to application of a certain force to the input point $P_3$ is acquired, and the frequency response characteristic $G_{33}$ FFT-converted in the FFT analyzer 24 is acquired (see FIG. 7). Additionally, the acceleration $A_4$ of the output point $P_4$ in response to application of a certain force to the input point $P_3$ is acquired, and the frequency response characteristic $G_{43}$ FFT-converted in the FFT analyzer 24 is acquired (see FIG. 6).

In the above, the frequency response characteristic $G_{21}$, $G_{43}$ corresponds to an in-divided-system frequency response characteristic, which is associated with a physical quantity that is transmitted to an output point of a divided system when a force is inputted to an input point of the divided system. The frequency response characteristic $G_{22}, G_{33}$ corresponds to a connection-point frequency response characteristic, which is associated with a physical quantity that is transmitted to a connection point of a divided system (a point where the divided system is connected with another divided system) when a force is inputted to the connection point. In the present embodiment, the physical quantity is the acceleration $A_2, A_3$, $A_4$. It should be noted that as described above, the frequency response characteristics $G_{21}, G_{22}, G_{33}, G_{43}$ are, at predetermined frequency intervals, associated with the gain and the phase; however, in FIGS. 5-8, for simplicity, the phase is omitted and only a relation between the frequency and the gain is depicted.

In a related art, in order to perform arithmetic operations in the estimation equation Eq. (7) of the transfer function $H_{41\_sim}$, it is necessary to calculate the transfer functions $H_{21}$, $H_{22}, H_{33}, H_{43}$ by curve-fitting or the like from the obtained frequency response characteristics $G_{21}, G_{22}, G_{33}, G_{43}$. However, when there are many resonance components or anti-resonance components in the frequency response characteristics $G_{21}, G_{22}, G_{33}, G_{43}$, curve-fitting accuracy may be low because it is difficult to set an appropriate order of the transfer function or an appropriate initial value of each term of the transfer function, or in some case, the curve-fitting cannot be performed and the transfer function cannot be calculated because of an excessively-large processing load. Additionally, for example, when the transfer function is calculated by using only resonance components in a part of the frequencies, the obtained transfer function may disadvantageously have a large difference from the actual frequency response characteristic.

Figure 9:
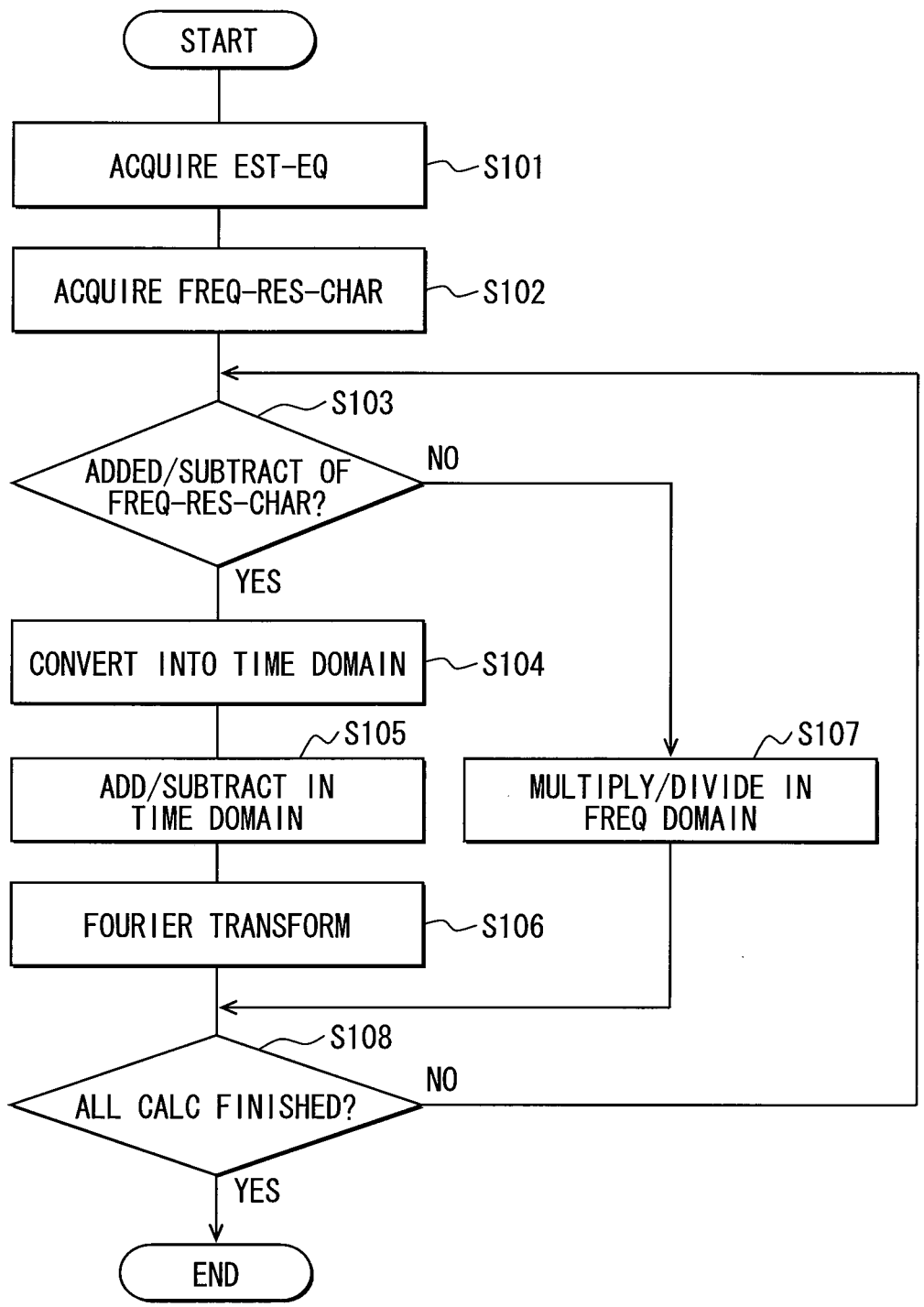
FIG. 9 is flowchart illustrating a transfer function estimation method of the first embodiment.

In view of the above, in the present embodiment, the transfer functions $H_{21}, H_{22}, H_{33}, H_{43}$ are not calculated from the frequency response characteristics $G_{21}, G_{22}, G_{33}, G_{43}$ but the arithmetic operation in the estimation equation of the transfer function $H_{41\_sim}$ of the whole system is performed by using the frequency response characteristics $G_{21}, G_{22}, G_{33}, G_{43}$ in place of the transfer functions $H_{21}, H_{22}, H_{33}, H_{43}$ in Eq. (7). An estimation method of the transfer function $H_{41\_sim}$ of the whole system in the present embodiment will be illustrated based on the flowchart shown in FIG. 9.

First, at S101, the prestored estimation equation for estimating the transfer function $H_{4\_sim}$ of the whole system is acquired. At S102, the frequency response characteristics $G_{21}, G_{22}, G_{33}, G_{43}$, which are needed for the arithmetic operations in the estimation equation Eq. (7) acquired at S101, are acquired by an impact test, a vibration test, a finite element method, or the like. In this regard, the frequency response characteristics $G_{21}$, $G_{22}$, $G_{33}$, $G_{43}$ may be prestored in a memory or the like of the transfer function estimation apparatus 10, or may be internally acquired by a processor.

At S103, for each arithmetic operation in the estimation equation Eq. (7) (i.e., equation for estimating the transfer function $H_{41\_sim}$), it is determined whether or not addition or subtraction of the frequency response characteristics is to be preformed. When it is determined that the addition or subtraction of the frequency response characteristics is not to be preformed (No at S103), the procedure proceeds to S107. When it is determined that the addition or subtraction of the frequency response characteristics is to be preformed (YES at S103), the procedure proceeds to S104.

At S104, because it is difficult to perform the addition-subtraction between the frequency response characteristics in the frequency domain, the frequency response characteristics targeted for the addition-subtraction are converted into time response characteristics. For example, since there is the addition of the frequency response characteristics $G_{22}$, $G_{33}$ in Eq. (7), the frequency response characteristics $G_{22}$, $G_{33}$ are converted into the time response characteristic $g_{22}$, $g_{33}$. A method of converting the frequency response characteristic into the time response characteristic will be illustrated later. At S105, the time response characteristics $g_{22}$, $g_{33}$ obtained by the conversion at S104 are used to perform the addition in the time domain. At S106, $g_{22}+g_{33}$, which is a result of the addition at S105, is reconverted into the frequency domain by Fourier transform, whereby $G_{22}+G_{33}$ is obtained.

When it is determined that the addition or subtraction of the frequency response characteristics is not to be preformed (No at S103), in other words, when multiplication or division is to be performed, the procedure proceeds to S107. At S107, the multiplication or division of the frequency response characteristics is performed in the frequency domain. It should be noted that the multiplication-division between the frequency response characteristics in the frequency domain can be easily performed because it can be treated as the addition-subtraction of the gains.

At S108, it is determined whether or not all arithmetic operations (all calculations) in the estimation equation acquired at S102 have been completed. When it is determined that all calculations have not been completed (NO at S108), the process returns to S103. When it is determined that all calculations have been completed (YES at S108), this procedure is ended.

Now, a method in S104 for converting the frequency response characteristic from the frequency domain to the time domain will be illustrated based on FIGS. 10A-10B and FIGS. 11A-11D.

Figure 10A:
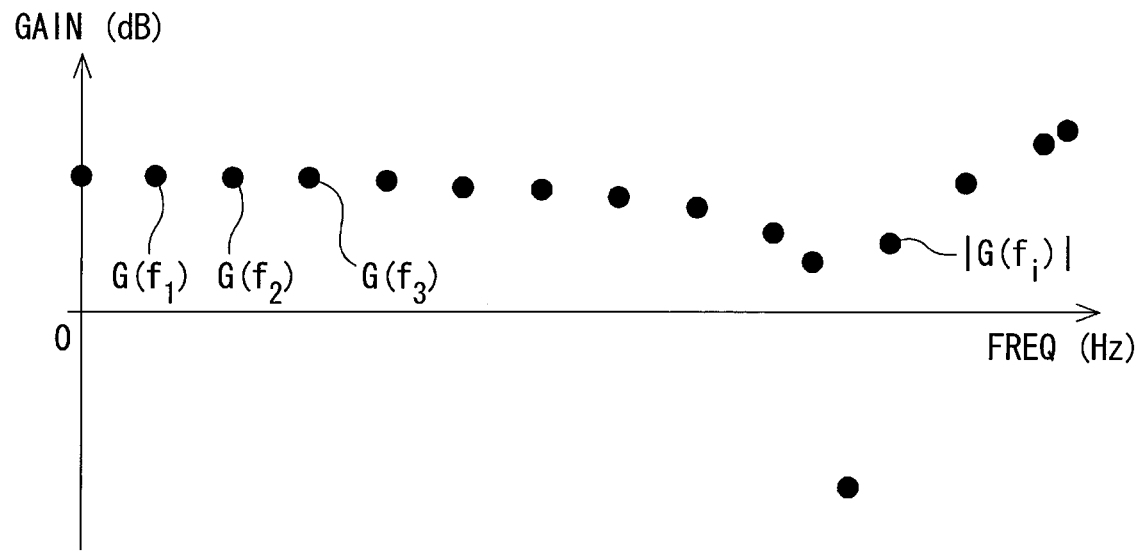
FIGS. 10A and 10B are diagrams illustrating gain and phase of the frequency response characteristic of the first embodiment.
Figure 10B:
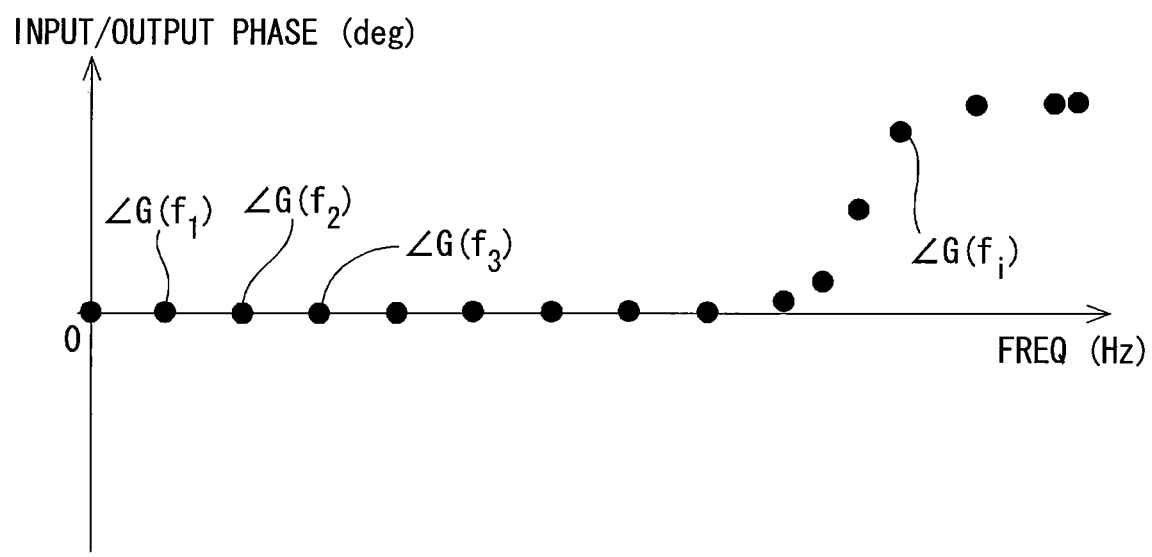

As shown in FIG. 10A, in a frequency response characteristic $G_{mn}$, the frequency $f_i$ is associated with the gain $G(f_i)$ at 1 Hz intervals, such that the gain $G(f_1)$ is associated with a frequency of $f_1=1$ Hz, the gain $G(f_2)$ is associated with a frequency of $f_2=2$ Hz, and the gain $G(f_3)$ is associated with a frequency of $f_3=3$ Hz. Additionally, as shown in FIG. 10B, in a frequency response characteristic $G_{mn}$, the frequency $f_i$ is associated with the phase $\angle G(f_i)$ at 1 Hz intervals such that, the phase $\angle G(f_i)$ is associated with a frequency of $f_1=1$ Hz, the phase $\angle G(f_2)$ is associated with a frequency of $f_2=2$ Hz, and the phase $\angle G(f_3)$ is associated with a frequency of $f_3=3$ Hz.

In the present embodiment, on assumption that an input waveform to be inputted is a unit impulse response, the frequency response characteristic $G_{mn}$ is converted into the time response characteristic $g_{mn}$.

Figure 28A:
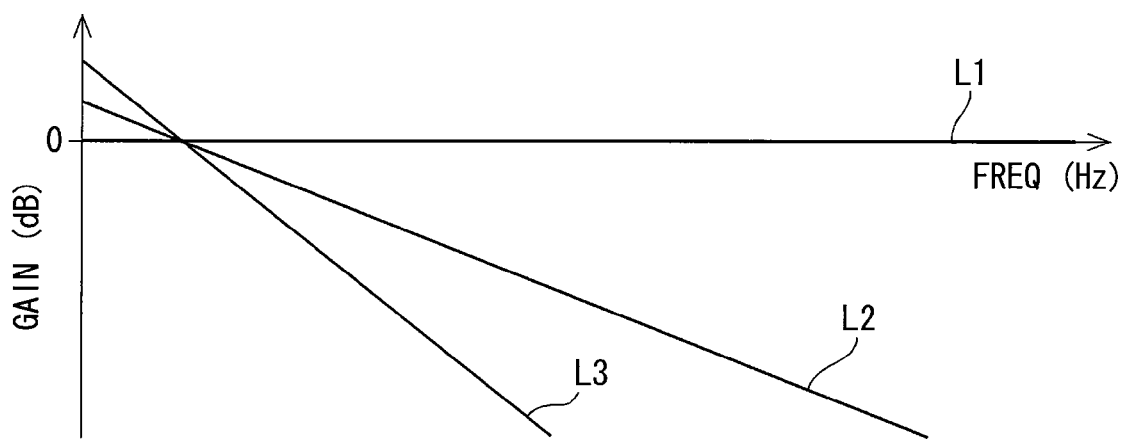
FIGS. 28A to 28B are diagrams illustrating a unit impulse response, a step response, and a ramp response.
Figure 28B:
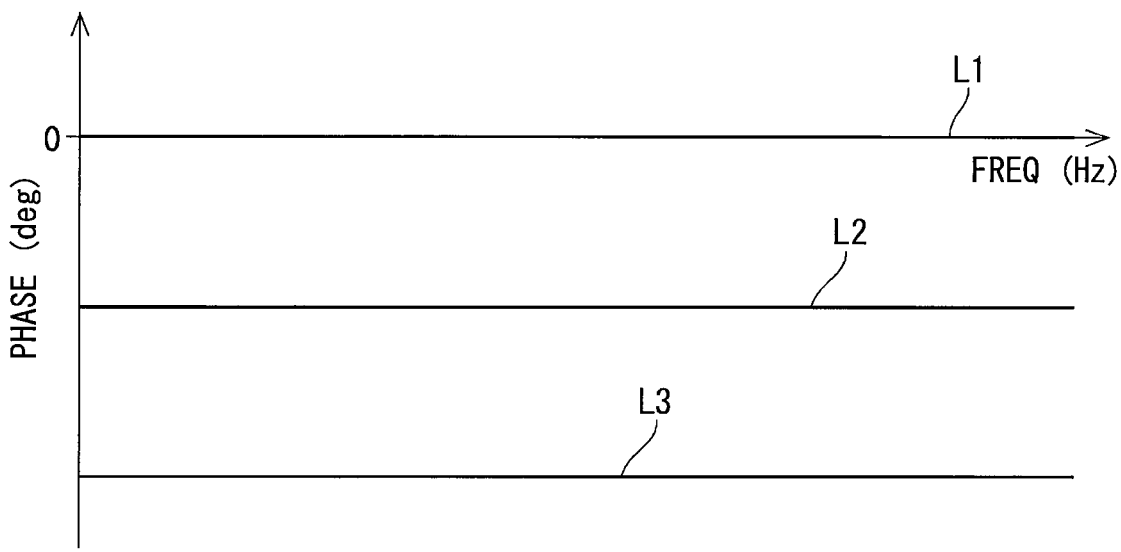

In the present embodiment, a virtual input wave is a unit impulse response. When the unit impulse response is used as the virtual input wave, the time response characteristic $g_{mn}$ converted in the time domain uniformly has information on whole frequency range without phase delay and does not depend on a frequency characteristic of the virtual input wave. Additionally, the transfer function of the unit impulse response is $H(s)=1$, and has the gain of 0 dB and the phase of 0 deg in a whole frequency range, as shown in FIG. 28, Thus, it is unnecessary to correct the gain and the phase of the frequency characteristic of the virtual input wave, and it is possible to use, without changes, the gain $G(f_n)$ and the phase $\angle G(f_n)$ of the frequency response characteristic $G_{mn}$ for the arithmetic operation. Therefore, it is possible to reduce a time and effort in arithmetic operation.

Figure 11A:
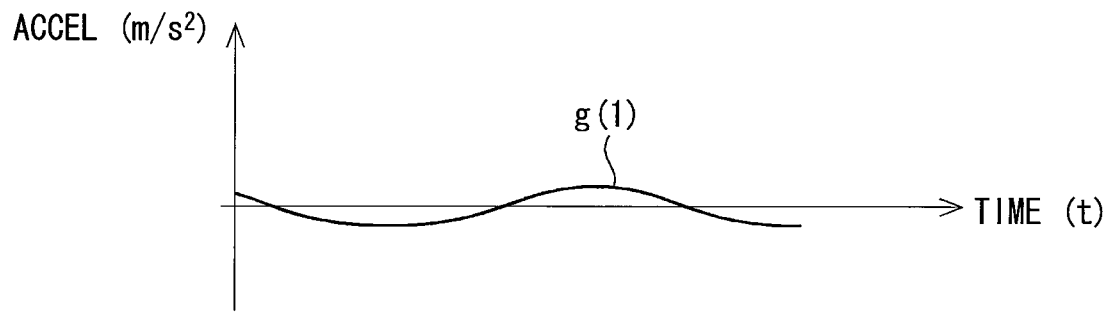
FIGS. 11A to 11D are diagrams illustrating converting the frequency response characteristic from a frequency domain to a time domain.

When the time response g(1) such as illustrated in FIG. 11A is calculated based on the gain $G(f_1)$ and the phase $\angle G(f_1)$ at the frequency f1=1 Hz, the following equation (8) can be obtained.

$$g(1)=|G(f1)| \times \cos(2\pi f_1 t + \angle G(f_1)) \qquad (8)$$

Figure 11B:
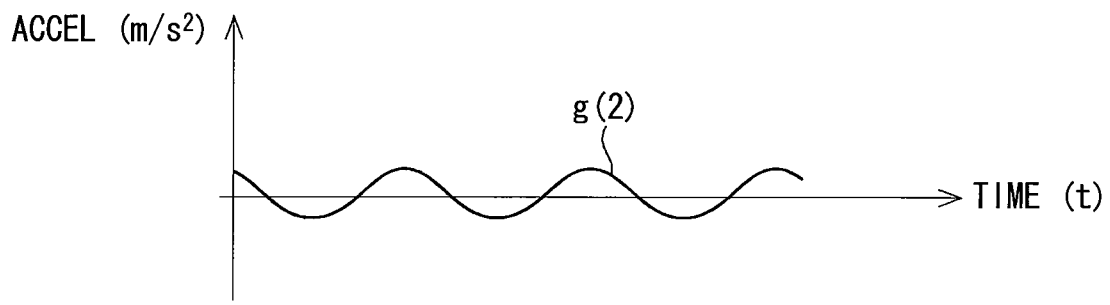
Figure 11C:
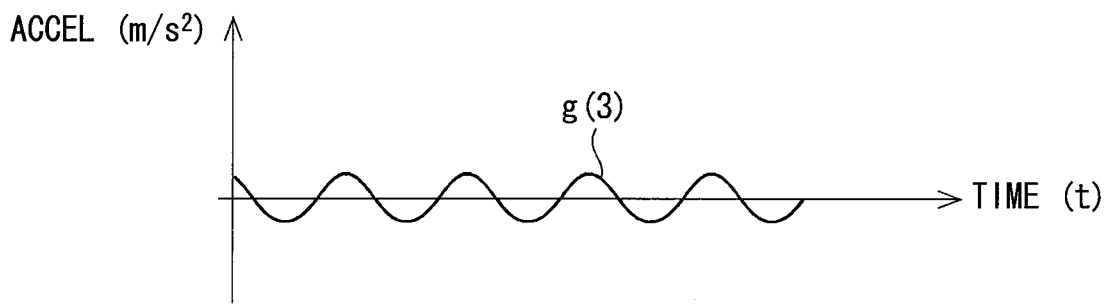
Figure 11D:
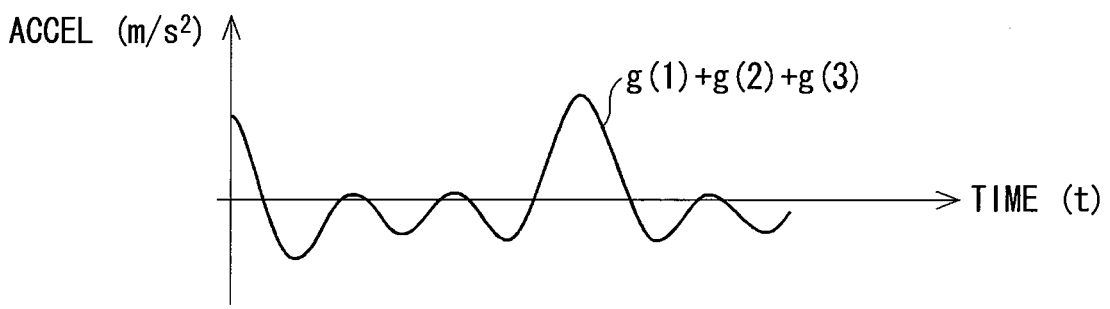

Likewise, the time responses g(2) and g(3) at the frequencies $f_2=2$ Hz and $f_3=3$ Hz, as illustrated in FIGS. 11B and 11C, can be expressed as the following Eqs. (9) and (10).

$$g(2)=|G(f_2)| \times \cos(2\pi f_2 t + \angle G(f_2)) \qquad (9)$$

$$g(3)=|G(f_3)| \times \cos(2\pi f_3 t + G(f_3)) \qquad (10)$$

The time response g(i) at the frequency $f_i$ can be expressed as the following Eq. (11).

$$g(i)=|G(fi)| \times \cos(2\pi f_i t + G(f_i)) \qquad (11)$$

The time response at each frequency can be expressed with a trigonometric function and can be easily added. For example, g(1)+g(2)+g(3) can be illustrated as FIG. 11D.

In this way, by adding time responses at respective frequencies in a predetermined frequency range, it is possible to calculate the time response characteristic $g_{mn}$ converted from the frequency domain's frequency response characteristic $G_{mn}$. For example, in cases where the frequency interval is 1 and the frequency band is 1 to N, the time response characteristic $g_{mn}$, which is obtained by converting the frequency domain's frequency response characteristic $G_{mn}$, can be expressed as the following equation (12).

$$g_{mn} = \sum_{i=1}^{N} |G(f_i)| \times \cos(2\pi f_i t + \angle G(f_i)) \qquad (12)$$

In the above, the frequency interval can be appropriately set in accordance with the resolution of the FFT analyzer 24 or the like. Additionally, the frequency range can be appropriately set to any simulation target frequency ranges. For example, when the frequency interval is 0.1 Hz and a width of the simulation target frequency range is several thousands Hz, the number of trigonometric functions to be added is an order of ten thousands. Since the addition of trigonometric functions about ten thousands times can be sufficiently performed with a typical PC available at the present time, the frequency response characteristic $G_{mn}$ can be converted into the time response characteristic $g_{mn}$.

Next, with reference to FIGS. 12A-12B, FIGS. 13A-13C and FIG. 14, consistency of the following two results will be illustrated. One result is a result obtained not by calculating the transfer function $H_{mn}$ from the frequency response characteristic $G_{mn}$ but by (i) converting the frequency response characteristic $G_{mn}$ into the time response characteristic $g_{mn}$, (ii) adding/subtracting in the time domain and (iii) reconverting into the frequency domain. The other result is a result obtained by calculating the transfer function $H_{mn}$ from the frequency response characteristic $G_{mn}$. As for the frequency response characteristic $G_x$, $G_y$ in FIGS. 12A-12D and FIG. 14, only the gain is depicted and the phase is omitted.

Figure 12A:
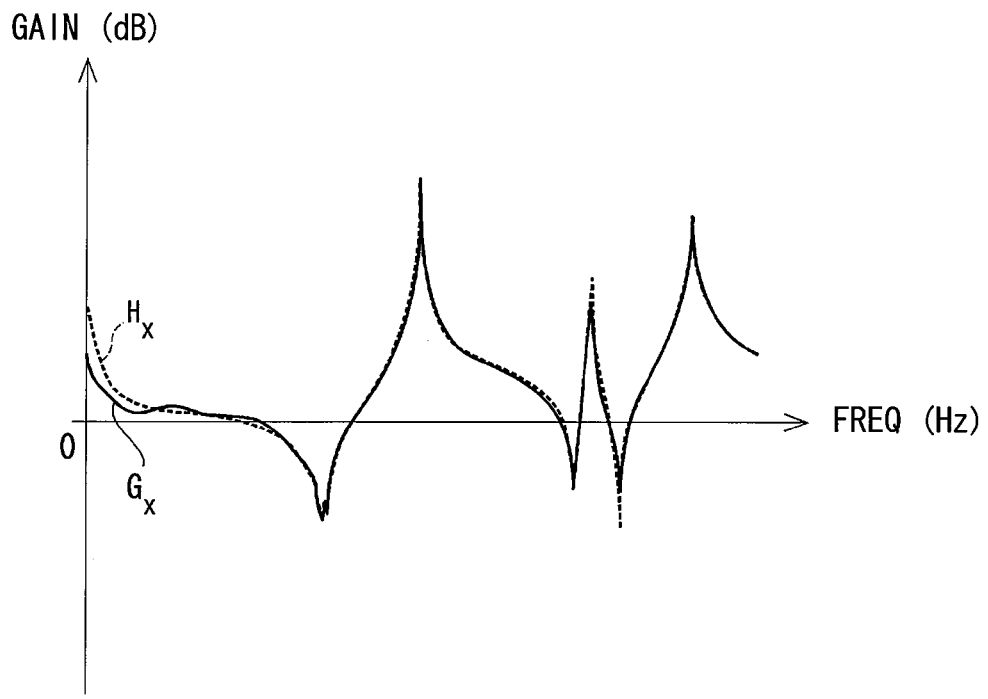
FIGS. 12A and 12B are diagrams illustrating a frequency response characteristic and a transfer function of the first embodiment.
Figure 12B:
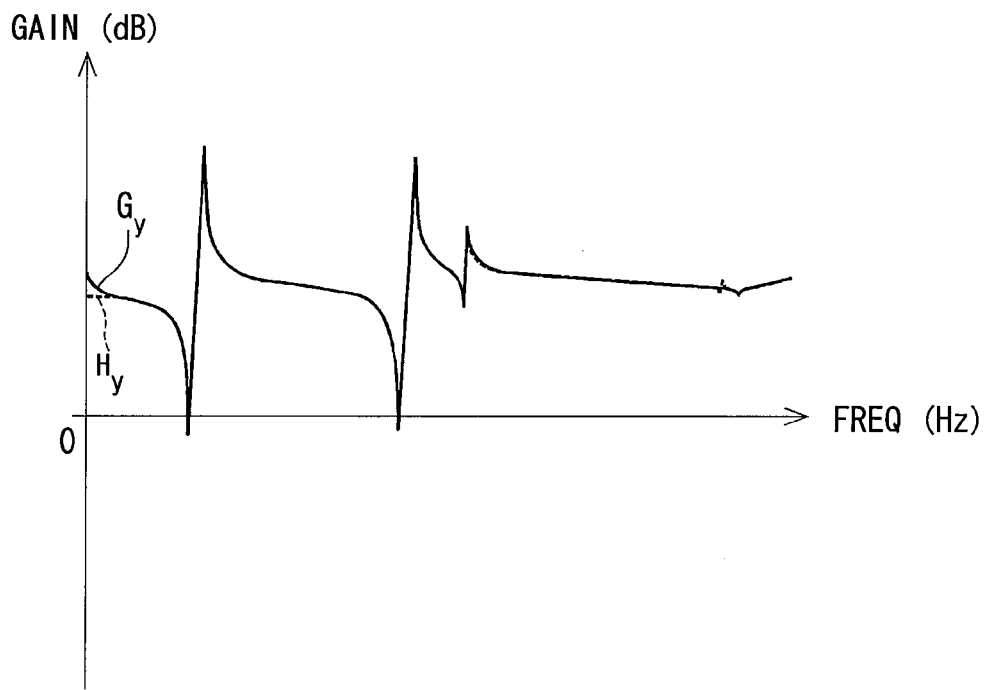
Figure 13A:
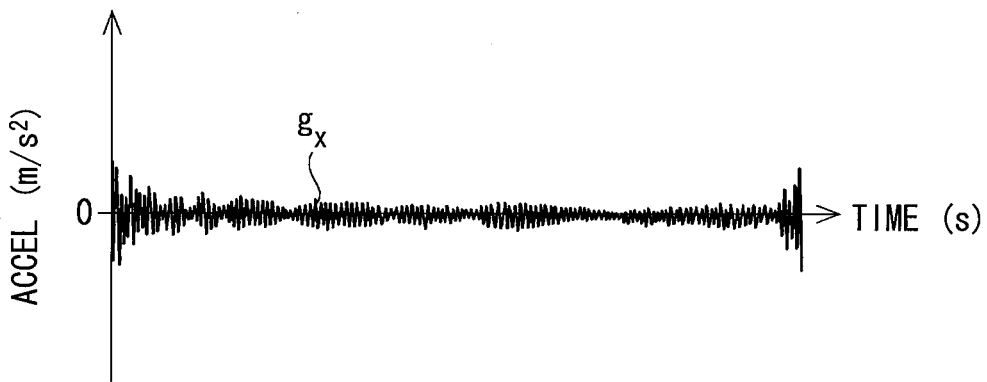
FIGS. 13A to 13C are diagrams illustrating addition in a time domain.
Figure 13B:
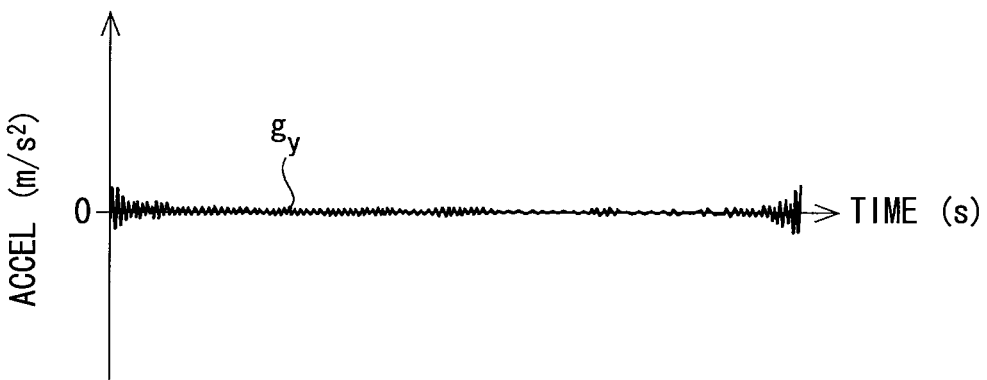
Figure 13C:

As for the frequency response characteristic $G_x$ illustrated as the solid line in FIG. 12A, the transfer function $H_x$ calculated by curve fitting is provided as the broken line in FIG. 12A. As for the frequency response characteristic $G_y$ illustrated as the solid line in FIG. 12B, the transfer function $H_y$ calculated by curve fitting is provided as the broken line in FIG. 12B.

Additionally, the time response characteristic $g_x$ (see FIG. 13A) is calculated by conversion of the frequency response characteristic $G_x$ into the time domain, and the time response characteristic $g_y$ (see FIG. 13B) is calculated by conversion of the frequency response characteristic $G_y$ into the time domain. By using the calculated time response characteristics $g_x$ and $g_y$, the calculation of $g_x+g_x$ is performed in the time domain (see FIG. 13C). Since the addition-subtraction between the time response characteristics in the time domain can be treated as addition-subtraction of accelerations, this is an easily-performable calculation.

Then the calculated $g_x+g_y$ is converted into the frequency domain by FFT conversion, whereby the $G_x+G_y$ in the frequency domain is obtained. The obtained $G_x+G_y$ is illustrated as the solid line in FIG. 14.

Figure 14:
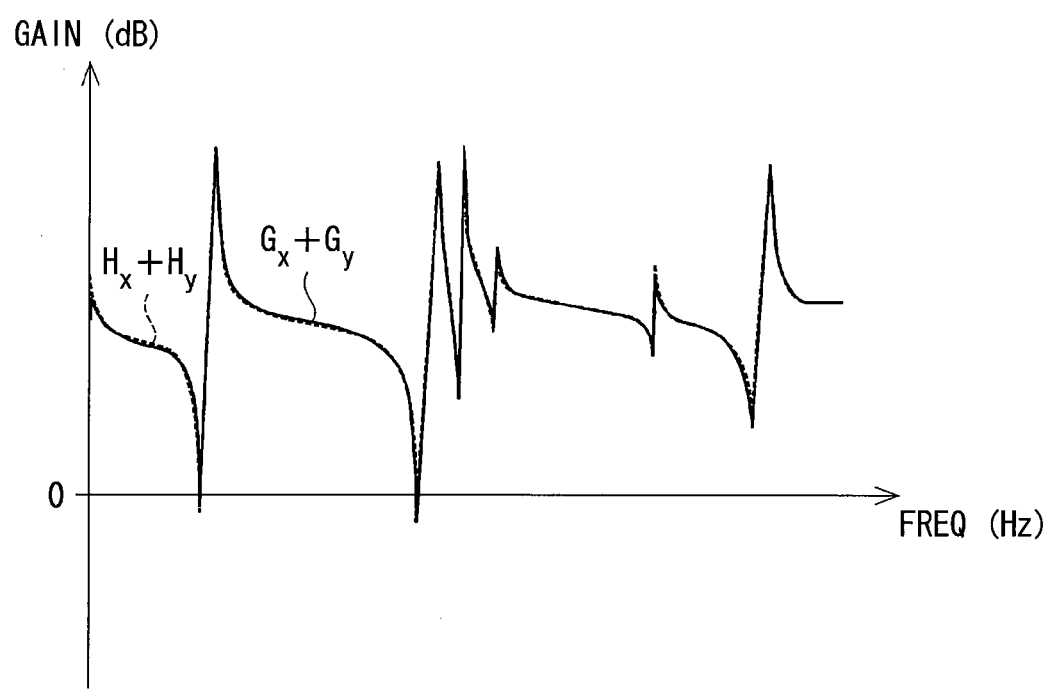
FIG. 14 is a diagram illustrating a result of addition-subtraction in a time domain and a result of addition-subtraction between transfers functions.

A broken line in FIG. 14 illustrates $H_x+H_y$, which is addition of the transfer function $H_x$ of the frequency response characteristic $G_x$ and the transfer function $H_y$ of the frequency response characteristic $G_y$. As shown in FIG. 14, Gx+Gy, which is obtained by the addition in the time domain and the reconversion into the frequency domain, is substantially consistent with $H_x+H_y$, which is obtained by addition of the transfer functions in the frequency domain.

Thus, instead of the addition-subtraction between the transfer functions, the present embodiment performs (i) the conversion of the frequency response characteristics into the time response characteristics, (ii) the addition-subtraction between the time response characteristics, and (iii) the reconversion of a result of the addition-subtraction into frequency domain.

Now, the arithmetic operations in the estimation equation Eq. (7) of the transfer function $H_{41\_sim}$ of the whole system of the measurement target object 30 will be more specifically illustrated.

Figure 15:
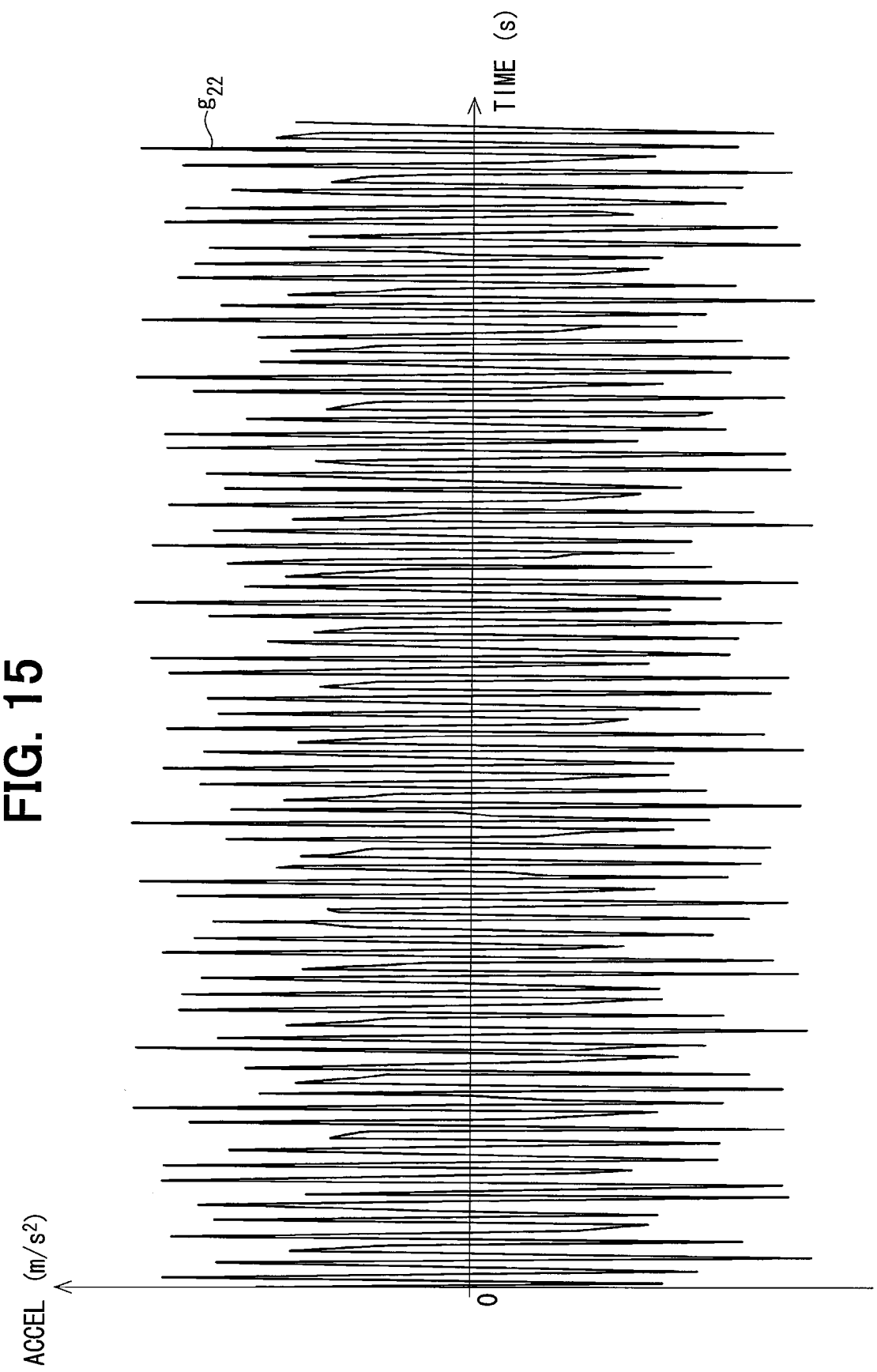
FIG. 15 is a diagram illustrating a time response characteristic $g_{22}$ of the first embodiment.
Figure 16:
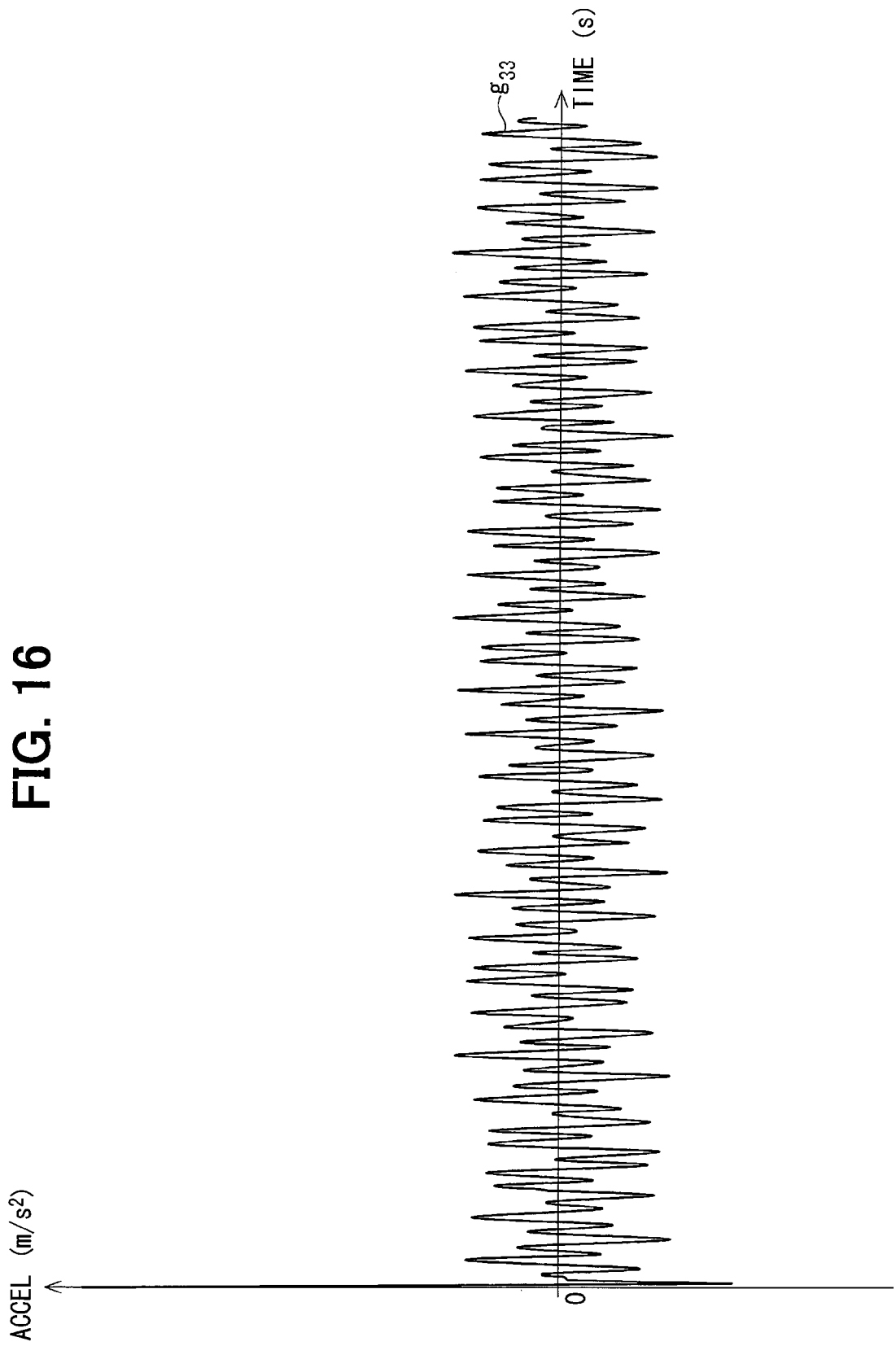
FIG. 16 is a diagram illustrating a time response characteristic $g_{33}$ of the first embodiment.

In the denominator of Eq. (7), $H_{22}$ and $H_{33}$ are added (YES at S103 in FIG. 9). Thus, the frequency response characteristics $G_{22}$ (see FIG. 6) and $G_{33}$ (see FIG. 7) corresponding to the transfer functions $H_{22}$ and $H_{33}$ are converted into the time domain, and thereby, the time response characteristics $g_{22}$ (see FIG. 15) and $g_{33}$ (see FIG. 16) are obtained (S104).

Figure 17:
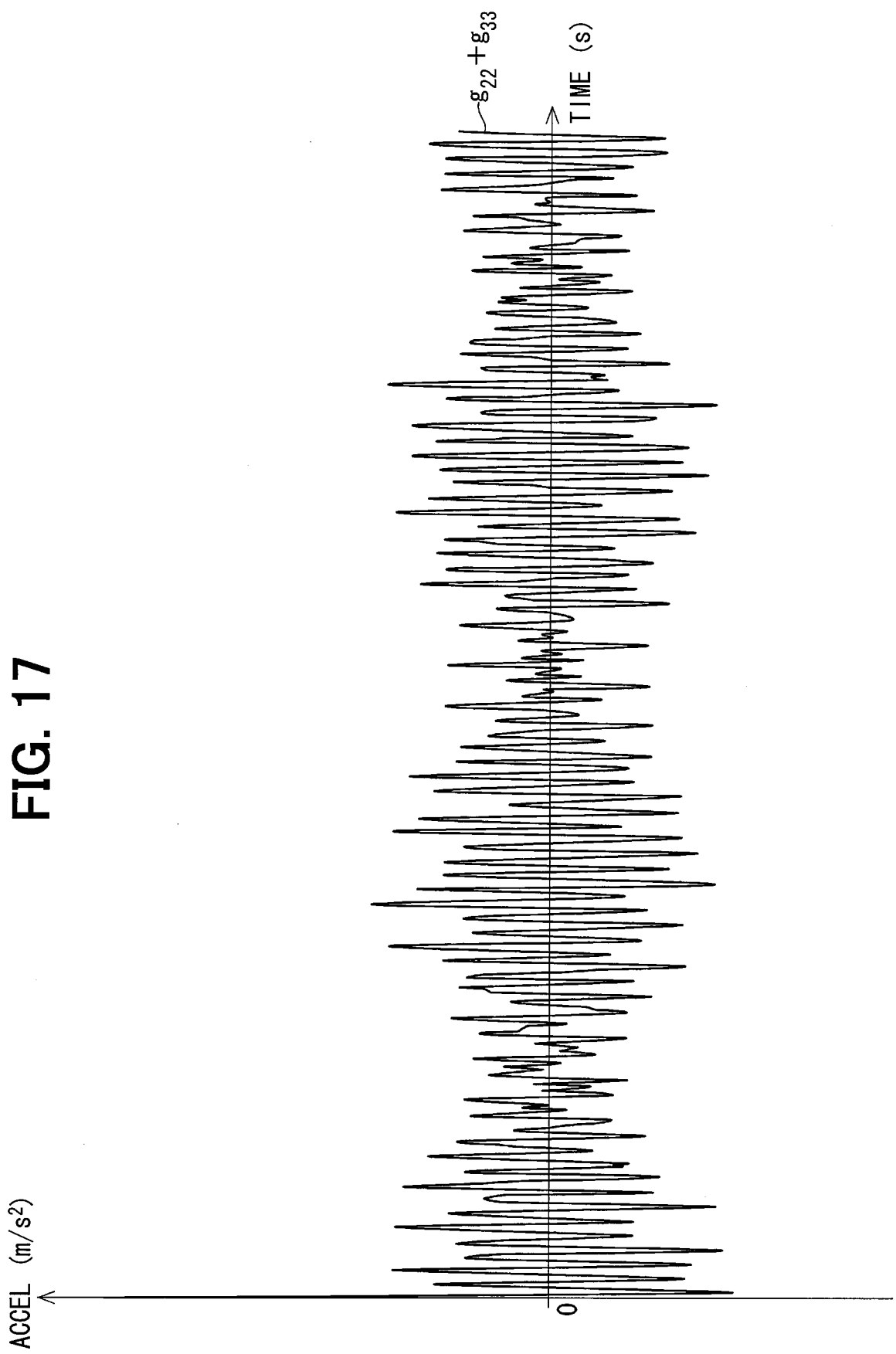
FIG. 17 is a diagram illustrating a time-domain addition-subtraction result.
Figure 18:
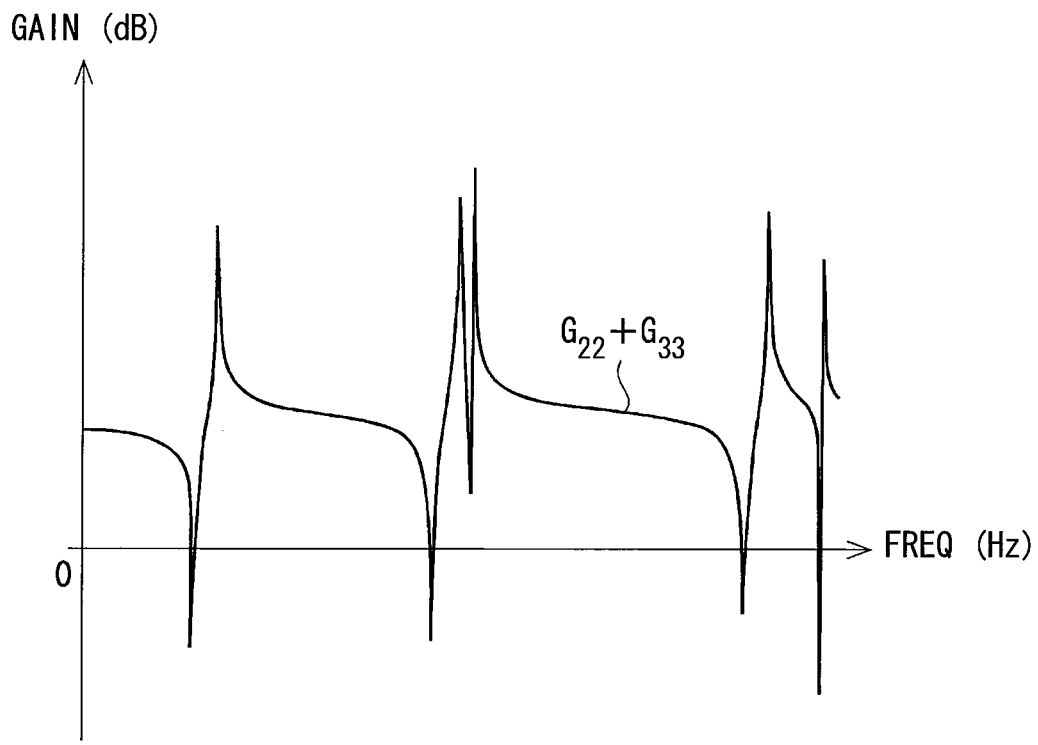
FIG. 18 is a diagram illustrating reconverting a time-domain addition-subtraction result from a time domain to a frequency domain.

The calculation $g_{22}+g_{33}$ is performed (see S105 FIG. 17) using the obtained time response characteristics $g_{22}$ and $g_{33}$. The calculated $g_{22}+g_{33}$ is reconverted into the frequency domain by FFT conversion, and thereby $G_{22}+G_{33}$ is obtained (see S106 and FIG. 18).

Figure 19:
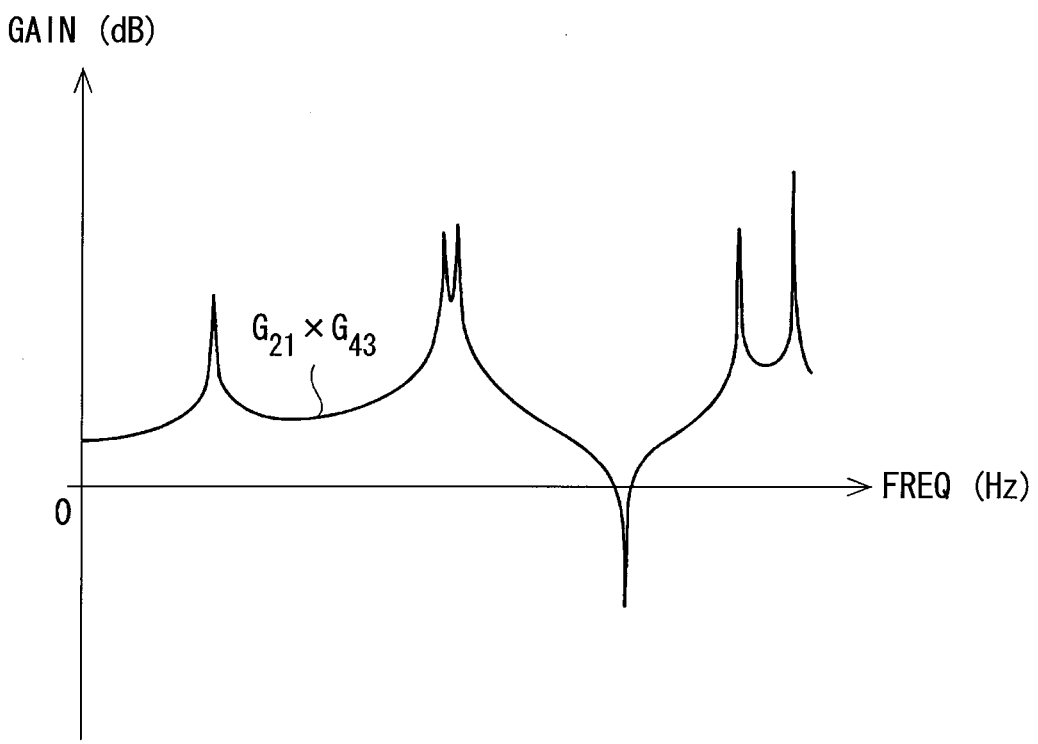
FIG. 19 is a diagram illustrating multiplication in a frequency domain of the first embodiment.

In the numerator of Eq. (7), H21 and H43 are multiplied (NO at S103). Since the multiplication-division arithmetic operation can be performed in the frequency domain, the frequency response characteristics $G_{21}$ and $G_{43}$ corresponding to the transfer functions $H_{21}$ and $H_{43}$ are not converted into the time domain but are multiplied in the frequency domain, and thereby $G_{21} \times G_{43}$ is obtained (see S107 and FIG. 19). In this regard, the multiplication in the frequency domain is calculated by the addition of the gains.

Figure 20:
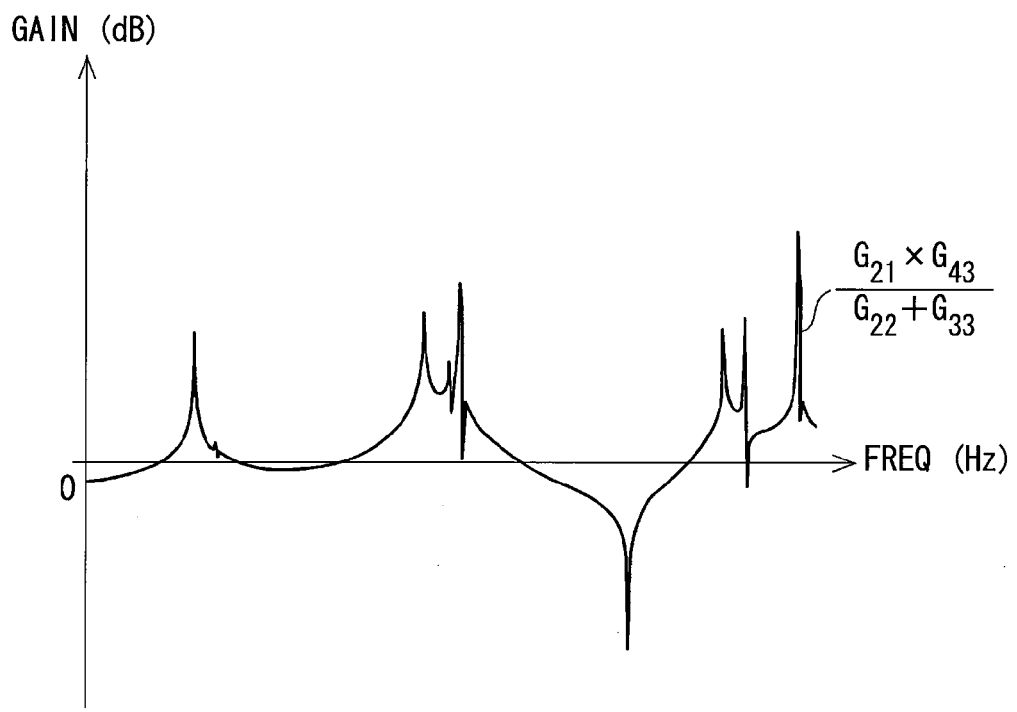
FIG. 20 is a diagram illustrating division in a frequency domain of the first embodiment.

Moreover, in Eq. (7), $H_{21} \times H_{43}$ is divided by $H_{22}+H_{33}$ (No at S103), and thus, the division is performed in the frequency domain to obtain $(G_{21} \times G_{43})/(G_{22}+G_{33})$ (see S107 and FIG. 20). In this regard, the division in the frequency domain is calculated by the subtraction of the gains.

As described above, when the arithmetic operation is the addition-subtraction, the arithmetic operation is performed in the time domain by using the time response characteristics obtained by conversion of the frequency response characteristics into the time domain. When the arithmetic operation is the addition-subtraction, the arithmetic operation is performed in the frequency domain by using the frequency response characteristics. In this way, it becomes possible to perform the arithmetic operations in the estimation equation Eq. (7) of the transfer function $H_{41\_sim}$ of the whole system without obtaining the transfer functions of the divided systems.

As specifically illustrated in the above, the transfer function estimation apparatus 10 estimates the transfer function $H_{41\_sim}$ of the measurement target object 30 constructed by the multiple divided systems 31, 32. The transfer function estimation apparatus 10 performs the following processes. Namely, the transfer function estimation apparatus 10 acquires (S101 in FIG. 9) the estimation equation Eq. (7), which is provided to estimate the transfer function $H_{41\_sim}$ of the measurement target object 30 determined in accordance with the number of divided systems 31,32 and the connection form of the divided systems 31, 32. Additionally, the transfer function estimation apparatus 10 acquires (S102) the frequency response characteristics $G_{21}$, $G_{22}$, $G_{33}$, $G_{43}$, which are data in the frequency domain and include the gains and phases associated with inputs to or outputs from the measurement target object 30.

The transfer function estimation apparatus 10 determines (S103), for each arithmetic operation in the estimation equation, whether the arithmetic operation is an addition-subtraction or a multiplication-division. When it is determined that the arithmetic operation is the multiplication-division, the transfer function estimation apparatus 10 performs (S107) the multiplication-division of the frequency response characteristic $G_{21}$, $G_{43}$ in the frequency domain. When it is determined that the arithmetic operation is the addition-subtraction, the transfer function estimation apparatus 10 calculates (S104) time response characteristic $g_{22}$, $g_{33}$ by converting the frequency response characteristics, which are targeted for the addition-subtraction, into the time domain, and further, the transfer function estimation apparatus 10 performs (S105) the addition-subtraction of the time response characteristics $g_{22}$, $g_{33}$ in the time domain. Thereafter, the transfer function estimation apparatus 10 reconverts (S106) the calculated result $g_{22}+g_{33}$ of the addition-subtraction into the frequency domain, thereby obtaining $G_{22}+G_{33}$.

In the present embodiment, the frequency response characteristics $G_{21}$, $G_{22}$, $G_{33}$, $G_{43}$ are used in the arithmetic operations in the estimation equation, where the estimation equation estimates the transfer function $H_{41\_sim}$ of the whole system of the measurement target object 30. Since it is possible to perform the multiplication-division of frequency response characteristics in the frequency domain, the multiplication-division of frequency response characteristics is performed in the frequency domain. By contrast, since it is difficult to perform the addition-subtraction of frequency response characteristics in the frequency domain, the frequency response characteristics are converted into the time domain to perform the arithmetic operation in the time domain. In this way, without calculating the transfer functions $H_{21}$, $H_{22}$, $H_{33}$, $H_{43}$ of the divided systems of the measurement target object 30, it is possible to perform the arithmetic operations in Eq. (7), which is the estimation equation of the transfer function $H_{41\_sim}$ of the whole system. Moreover, since the frequency response characteristics $G_{21}$, $G_{22}$, $G_{33}$, $G_{43}$ of the measurement target object 30 are used without change, it is possible to highly accurately estimate the transfer function $H_{41\_sim}$ of the whole system as compared with cases where the curve-fitting is performed by using only a part of the resonance components. In this way, even when the measurement target object 30 has a complicated structure like, for example, an electric power steering apparatus, it becomes possible to perform high accuracy vibration or sound simulation.

Moreover, in the present embodiment, a unit impulse response is used as a virtual input wave for converting the frequency response characteristic $G_{mn}$ into the time domain. The time response $g(f_i)$, which is a trigonometric function based on the gain $G(f_i)$ and the phase $\angle G(f_i)$ of the frequency response characteristic $G_{mn}$, is calculated at predetermined frequency intervals. The time response characteristic $g_{mn}$ is calculated by adding the calculated time responses at all frequencies. In the present embodiment, the unit impulse response used as a virtual input wave has zero gain and zero phase in a whole frequency range. Therefore, in converting into the time domain, it is possible use the gain $G(f_i)$ and the phase $\angle G(f_i)$ of the frequency response characteristic $G_{mn}$ without change. Accordingly, the arithmetic operations can be simplified and the processing load (the load of arithmetic operations) cab be reduced.

In the present embodiment, the in-divided system frequency response characteristics $G_{21}$, $G_{43}$ are acquired, where $G_{21}$, $G_{43}$ are associated with the physical quantities transmitted to the output points $P_2$, $P_4$ of the divided systems 31, 32 in response to the forces inputted to the divided systems 31, 32 respectively. Additionally, the frequency response characteristic $G_{22}$ is acquired, where $G_{22}$ is associated with the physical quantity transmitted to the output point $P_2$, which is a connection point connected to another divided system 32, in response to the force inputted to the output point $P_2$. Additionally, the frequency response characteristic $G_{33}$ is acquired, where $G_{33}$ is associated with the physical quantity transmitted to the output point $P_3$, which is a connection point connected to another divided system 31, in response to the force inputted to the output point $P_3$. By using these frequency response characteristics $G_{21}$, $G_{43}$, $G_{22}$, $G_{33}$, it is possible to appropriately perform arithmetic operations in the estimation equation Eq. (7) of the transfer function $H_{41\_sim}$ of the whole system of the measurement target object 30.

In the present embodiment, S101 performed by the transfer function estimation apparatus 10 can correspond to an example of estimation equation acquisition section or means. S102 performed by the transfer function estimation apparatus 10 can correspond to an example of frequency response characteristic acquisition section or means. S103 performed by the transfer function estimation apparatus 10 can correspond to an example of four arithmetic operation determination section or means. S107 performed by the transfer function estimation apparatus 10 can correspond to an example of multiplication-division section or means. S104 performed by the transfer function estimation apparatus 10 can correspond to an example of conversion section or means. S105 performed by the transfer function estimation apparatus 10 can correspond to an example of addition-subtraction section or means. S106 performed by the transfer function estimation apparatus 10 can correspond to an example of reconversion section.

(Second Embodiment)

A second embodiment differs from the first embodiment in a converting method of converting the frequency response characteristic $G_{mn}$ from the frequency domain to the time domain and a reconverting method of reconverting from the time domain to the frequency domain. In the conversion of the frequency response characteristic $G_{mn}$ from the frequency domain to the time domain, the first embodiment uses the unit impulse response as the virtual input wave while the second embodiment uses a unit step response as the virtual input wave.

When the step response is used as the virtual input wave, high frequency oscillating components are not excited in the converted data. Thus, when data precision in a low frequency region is required or data reliability in a high frequency region is low, it may be preferable to use the step response as the virtual input wave. When the virtual input wave is other than the unit impulse response, in other words, when the gain and phase of the virtual input wave are not zero, it is necessary to correct the frequency response characteristic by taking into account the gain and phase of the used virtual input wave when the conversion from the frequency domain to time domain is performed and the reconversion from the time domain to the frequency domain is performed.

Figure 21:
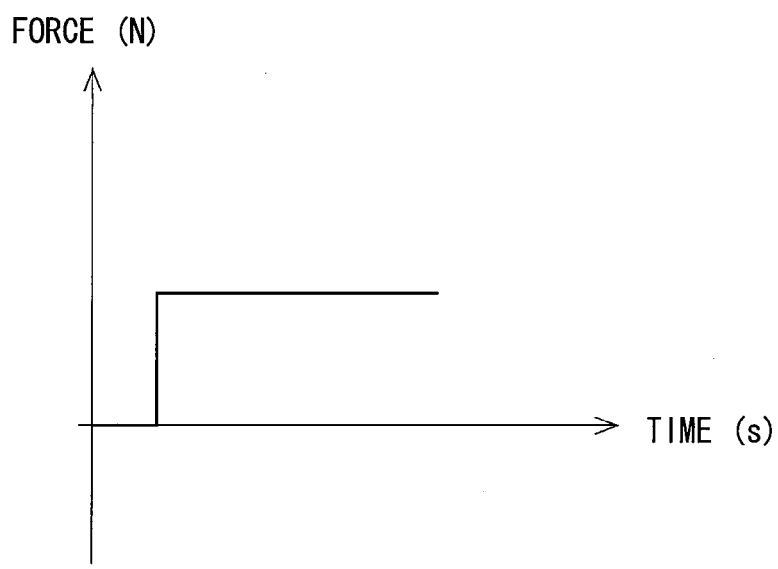
FIG. 21 is a diagram illustrating a step response which is a virtual input wave of a second embodiment.
Figure 22A:
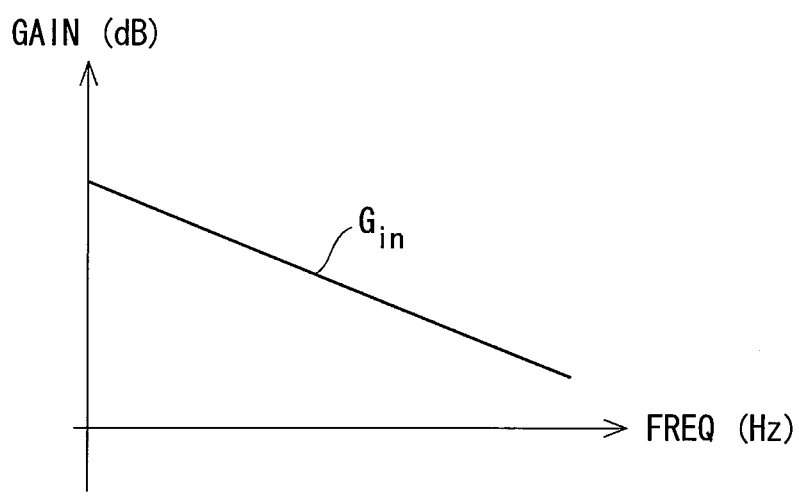
FIGS. 22A and 22B are diagrams illustrating gain and phase of a step response of the second embodiment.
Figure 22B:
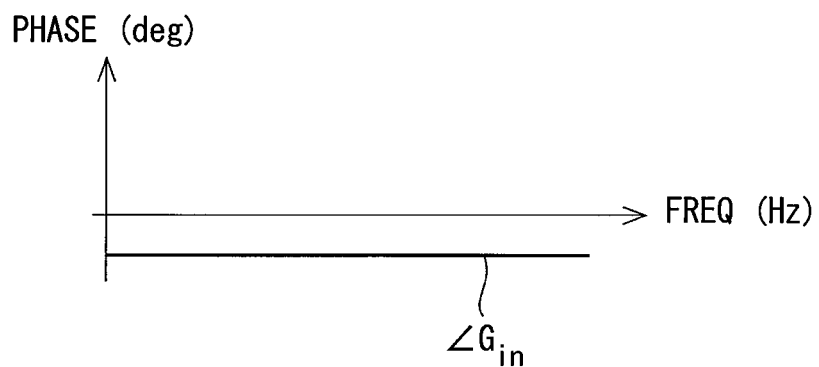

Now, explanation will be given on a method for converting the frequency response characteristic $G_{mn}$ into the time domain and a method for reconverting into the frequency domain. The step response used as the virtual input wave in the present embodiment has a transfer function expressed as $H(s)=1/s$, as shown in FIG. 21. When the FFT conversion is performed on this step response, the virtual input gain $G_{in}$ has an slope of −20 dB/dec as illustrated by the solid line L2 in FIGS. 22A and 28A and the virtual input phase $\angle G_{in}$ is −90 deg as a delay phase in the whole frequency range as illustrated by the solid line L2 in FIGS. 22B and 28B.

Figure 23A:
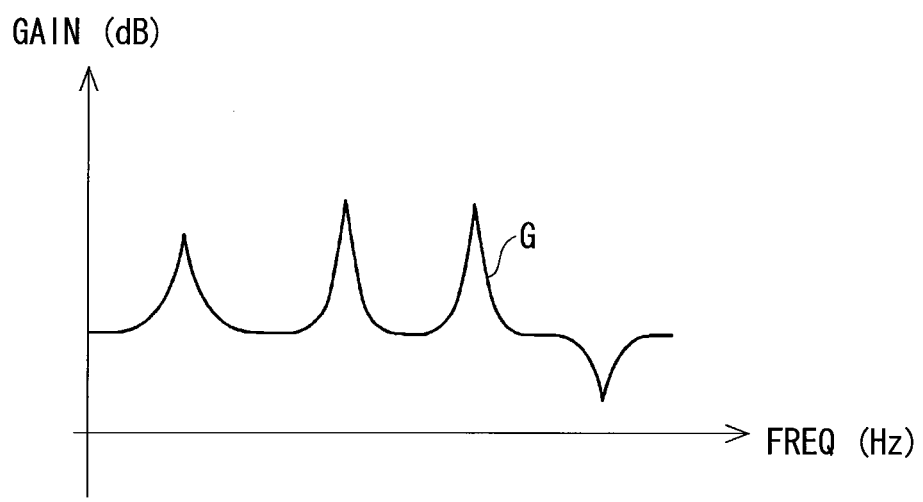
FIGS. 23A and 23B are diagrams illustrating gain and phase of a frequency response characteristic of the second embodiment.
Figure 23B:
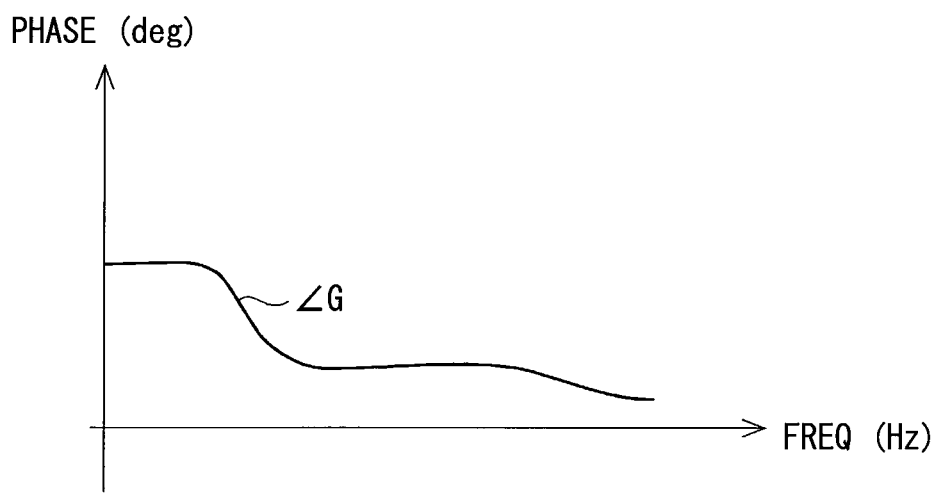

Now, the gain of the frequency response characteristic $G_{mn}$ converted into the time domain is denoted by G (see FIG. 23A) and the phase of the frequency response characteristic $G_{mn}$ converted into the time domain is denoted by $\angle G$ (see FIG. 23B). First, before the conversion into the time domain, the gain G and the phase $\angle G$ of the frequency response characteristic $G_{mn}$ are corrected with the virtual input gain $G_{in}$ and the virtual input phase $\angle G_{in}$ of the step response to calculate a corrected gain $G_a$ and a corrected phase $\angle G_a$.

Figure 24A:
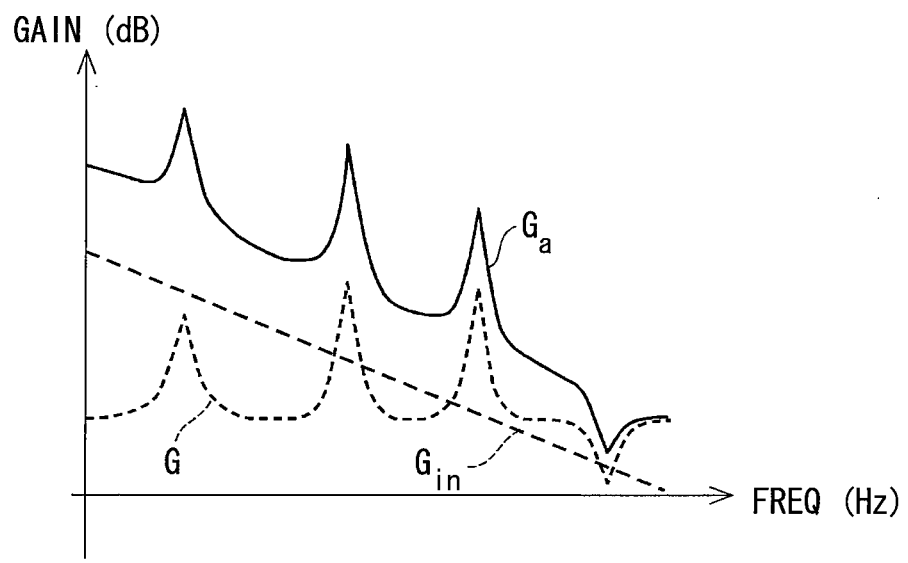
FIGS. 24A and 24B are diagrams illustrating correcting a frequency response characteristic with a virtual input wave.
Figure 24B:
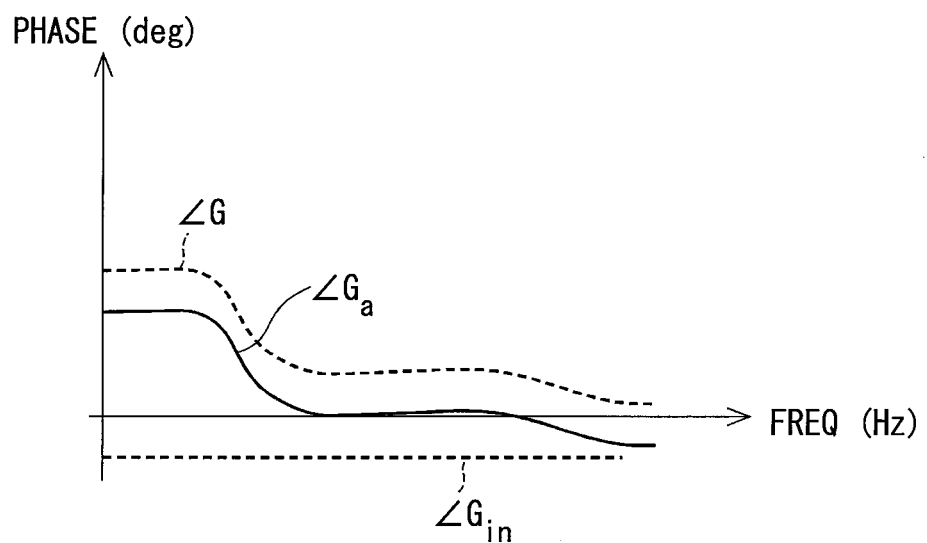

Specifically, as shown in Eq. 13, the corrected gain $G_a(f_i)$ is calculated by adding the virtual input gain $G_{in}$ of the step response to the gain $G(f_i)$ of the frequency response characteristic $G_{mn}$ (see FIG. 24A), where $G(f_i)$ is the gain G of the frequency response characteristic $G_{mn}$ at a certain frequency $f_i$, and $G_{in}(f_i)$ is the virtual input gain $G_{in}$ at the certain frequency fi.

$$G_a(f_i) = |G_{in}(f_i) + G(f_i)| \qquad (13)$$

Additionally, as shown in the below Eq. (14), the corrected phase $\angle G_a(f_i)$ is calculated by adding the virtual input phase $\angle G_{in}(f_i)$ of the step response to the phase $\angle G(fi)$ of the frequency response characteristic $G_{mn}$, where $\angle G(f_i)$ is the angle $\angle G$ of the frequency response characteristic $G_{mn}$ at a certain frequency $f_i$ and the virtual input phase $\angle G_{in}(f_i)$ is the virtual input phase $\angle G_{in}$ at the certain frequency $f_i$.

$$\angle G_a(f_i) = \angle G_{in}(f_i) + \angle G(f_i) \qquad (14)$$

Additionally, for each frequency, a trigonometric function based on the corrected gain $G_a(f_i)$ and the phase $\angle G_a(f_i)$ at the frequency $f_i$ is calculated as a time response $g(f_i)$. The time response $g(f_i)$ is expressed as Eq. (15).

$$g(f_i) = |G_{in}(f_i) + G(f_i)| \times \cos(2\pi f_i t + \angle G(f_i)) \qquad (15)$$
$$= |G_a(f_i)| \times \cos(2\pi f_i t + \angle G_a(f_i))$$

Figure 25:
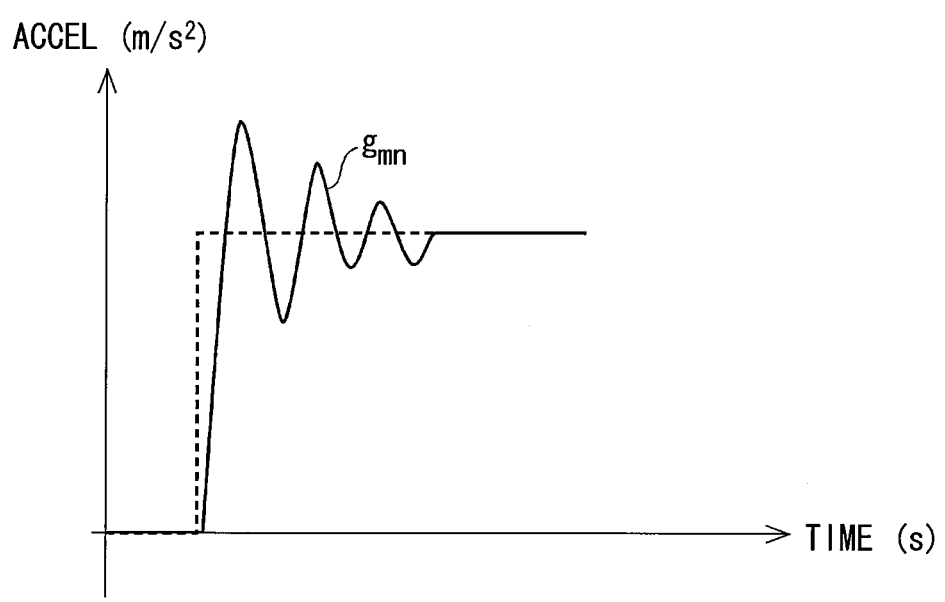
FIG. 25 is a diagram illustrating a time response characteristic of the second embodiment.

Thereafter, in a predetermined frequency range, the time responses calculated at respective frequencies are added. In this way, it is possible to calculate the time response characteristic $g_{mn}$, which is the data in the time domain converted from the frequency response characteristic $G_{mn}$ in the frequency domain using the step response as the virtual input wave. For example, when (i) the frequency interval of 1 and (ii) the frequency range of 1 to N and (iii) the step response is used as the virtual input wave, the time response characteristic $g_{mn}$ in the time domain converted from the frequency response characteristic $G_{mn}$ in the frequency domain can be expressed as the following Eq. (16) (see also FIG. 25).

$$g_{mn} = \sum_{i=1}^{N} |G_{in}(f_i) + G(f_i)| \times \cos(2\pi f_i t + \angle G_{in}(f_i) + \angle G(f_i)) \qquad (16)$$
$$= \sum_{i=1}^{N} |G_a(f_i)| \times \cos(2\pi f_i t + \angle G_a(f_i))$$

Figure 26A:
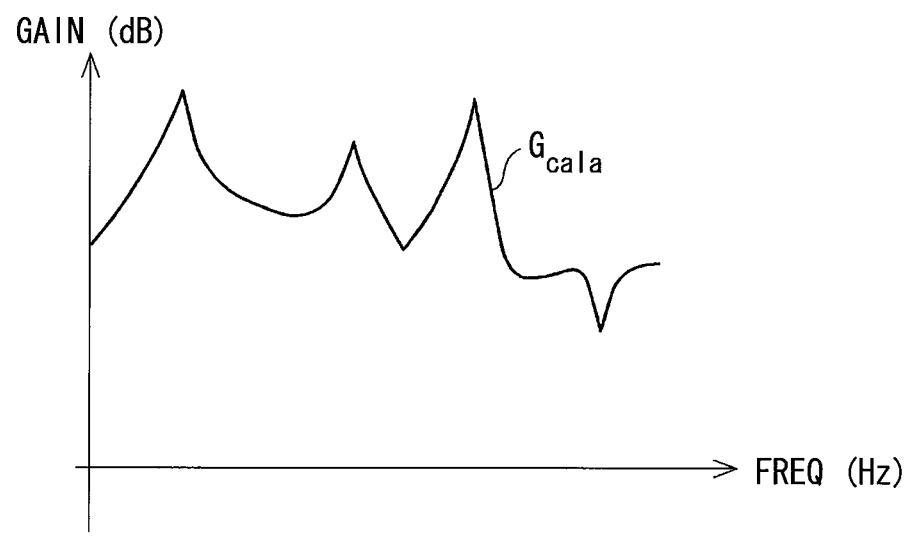
FIGS. 26A and 26B are diagrams illustrating gain and phase in a frequency domain converted from an addition-subtraction result.
Figure 26B:
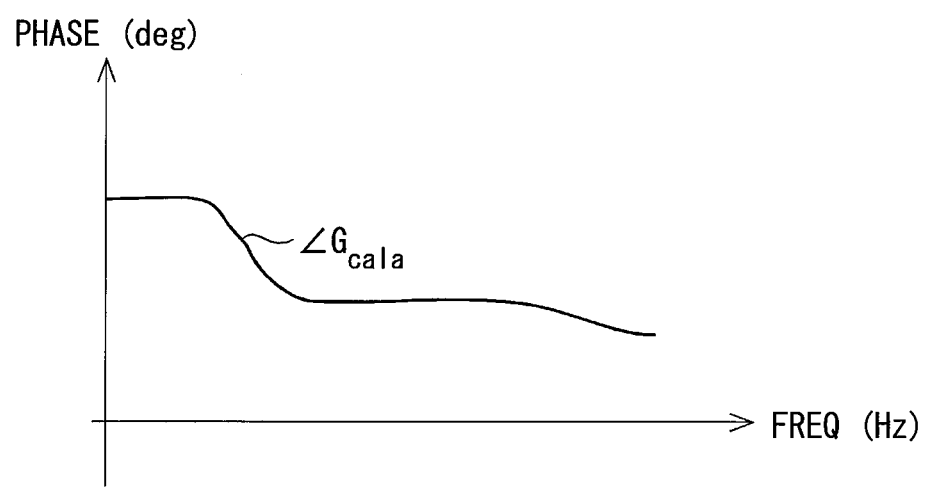

The calculated time response characteristic $g_{mn}$ can be used in the addition subtraction in the time domain, as illustrated in the first embodiment. A result $g_{cala}$ of the addition-subtraction in the time domain is reconverted into the frequency domain by FFT conversion. The result a $g_{cala}$ of the addition-subtraction reconverted into the frequency domain includes a reconverted gain $G_{cala}$ (see FIG. 26A) and a reconverted phase $\angle G_{cala}$ (see FIG. 26B).

In the present embodiment, since the step response is used as the virtual input wave, the corrected gain $G_a$ and the corrected phase $\angle G_a$ are used for the conversion into the time domain and the addition-subtraction in the time domain. In the above, the corrected gain $G_a$ is obtained by adding between the gain $G(f_i)$ of the frequency response characteristic $G_{mn}$ and the virtual input gain $G_{in}$ of the step response. The corrected phase $\angle G_a(f_i)$ is obtained by adding between the phase $\angle G(f_i)$ of the frequency response characteristic $G_{mn}$ and the virtual input phase $\angle G_{in}(f_i)$ of the step response. As a result, the reconverted gain $G_{cala}$ and the reconverted phase $\angle G_{cala}$, which are obtained by the conversion into the frequency domain after the addition-subtraction, are in states where the virtual input gain Gin and the virtual input phase $\angle$Gin of the step response have been added.

Because of this, in the frequency domain, the reconverted gain $G_{cala}$ and the reconverted phase $\angle G_{cala}$ are recorrected with the virtual input gain Gin and the virtual input phase $\angle$Gin of the strep response.

Figure 27A:
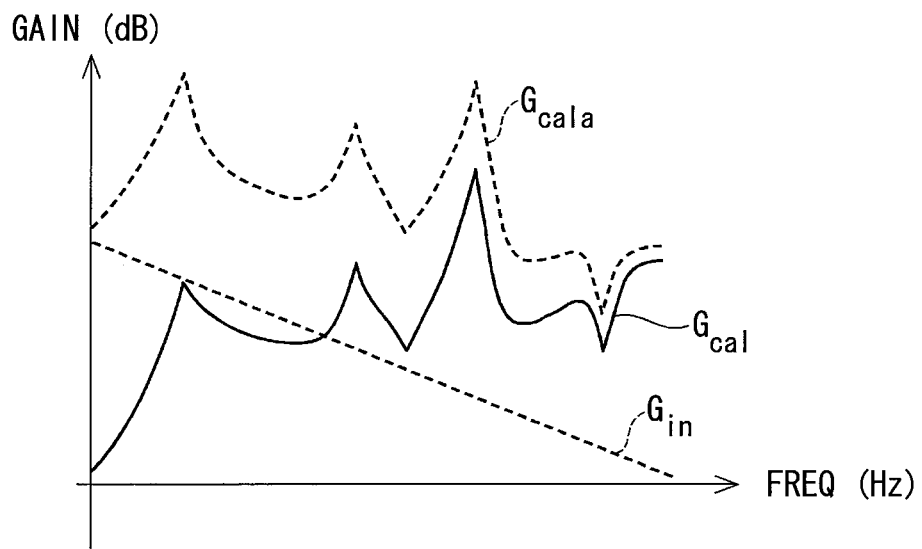
FIGS. 27A and 27B are diagrams illustrating recorrecting, with a virtual input wave, an addition-subtraction result converted into a frequency domain.

Specifically, as shown in the below Eq. (17), a recorrected gains $G_{cal}(f_i)$ is calculated (see FIG. 27A) by subtracting the virtual input gain $G_{in}(f_i)$ of the step response from the reconverted gain $G_{cala}(f_i)$, where $G_{cala}(f_i)$ is the reconversion gain $G_{cala}$ at a frequency $f_i$ and $G_{in}(f_i)$ is the virtual input gain $G_{in}(f_i)$ at the frequency $f_i$.

$$G_{cal}(f_i) = G_{cala}(f_i) - G_{in}(f_i) \qquad (17)$$

Figure 27B:
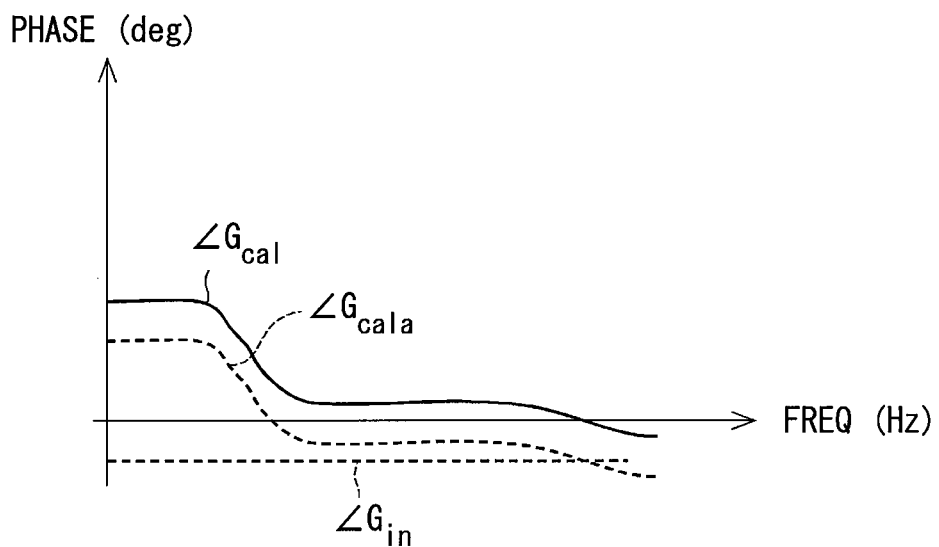

Additionally, as shown in Eq. (17), a recorrected phase $\angle G_{cal}(f_i)$ is calculated (see FIG. 27B) by subtracting the virtual input phase $\angle G_{in}(f_i)$ of the step response from the reconverted phase $\angle G_{cala}(f_i)$, where $\angle G_{cala}(f_i)$ is the reconverted phase $\angle G_{cala}$ at a frequency $f_i$ and $\angle G_{in}$(fi) is the virtual input phase $\angle G_{in}$ at the frequency $f_i$.

$$G_{cal}(f_i) = \angle G_{cala}(f_i) - \angle G_{in}(f_i) \qquad (18)$$

In the present embodiment, the virtual input gain $G_{in}$ and the virtual input phase $\angle G_{in}$ of the virtual input wave used for the conversion of the frequency response characteristic $G_{mn}$ into the time domain is acquired, and the frequency response characteristic $G_{mn}$ s corrected with the virtual input gain $G_{in}$ and the virtual input phase $\angle G_{in}$. The trigonometric function based on the corrected gain $G_a$ corrected with the virtual input gain $G_{in}$ and the corrected phase $\angle G_a$ corrected with the virtual input phase $\angle G_a$ is calculated as the time response $g(f_i)$. The time response characteristic $g_{mn}$ is obtained by adding together the calculated time responses $g(f_i)$ at respective frequencies. Additionally, the reconverted gain $G_{cala}$ and the reconverted phase $\angle G_{cala}$, which are the result of the addition subtraction reconverted into the frequency domain, are recorrected with the virtual input gain $G_{in}$ and the virtual input phase $\angle G_{in}$.

Because of the above, the present embodiment involves substantially the same advantages as the first embodiment. Additionally, in the present embodiment, a wave that is other than the unit impulse response and that has a non-zero gain and a non-zero phase can be used as the unit impulse response. This is because the frequency response characteristic $G_{mn}$ is corrected with the virtual input gain Gin and the virtual input phase angle $\angle G_{in}$, and the result of the addition-subtraction reconverted into the frequency domain is recorrected with the virtual input gain Gin and the virtual input phase angle $\angle G_{in}$.

In the above illustration of the present embodiment, the step response is used as the virtual input wave. However, for example, a ramp response may be used as the virtual input wave in order to further improve data precision in a low frequency region. The ramp response has a transfer function $H(s)=1/s^2$. As shown by the solid line in FIG. 28, the ramp response has a gain slope of −40 dB/dec and a phase of −180 deg in a whole frequency range. The ramp response can restrict excitation of high frequency oscillating components as compared with the step response. In this way, it is possible to appropriately select a virtual input wave suitable for a frequency range in which the simulation is to be performed.

Additionally, in cases where the simulation more directed to experimental data is to be performed, an actual input waveform (see FIG. 2) inputted with the impulse hammer 21 may be FFT-converted and the FFT-converted wave may be used as the virtual input wave.

(Other Embodiments)

(1) In the above embodiment, the number of divided systems of the measurement target object is two. In other embodiments, the number of divided systems of the measurement target object may be three or more. A form of connection between the divided systems is not limited to a straight shape connection but may be arbitrary connection form such as branching or the like. In the above embodiment, one divided system has one input point and one output point. In other embodiments, one divided system may have multiple input point or multiple output point. In the above embodiment, the divided systems of the measurement target object are connected rigidly. In other embodiments, the divided systems of the measurement target object may be connected not rigidly but for example flexibly. In this case, a predetermined constant or transfer function may be incorporated in the above-described Eq. (5) as a coefficient.

(2) In the above embodiment, a method for performing a four arithmetic operation without converting from the frequency response characteristic into the transfer function is illustrated. In other embodiments, if the transfer function is previously known or can be relatively easily derived from the frequency response characteristic, the arithmetic operation may be performed by using the transfer function. For example, when the addition-subtraction of the transfer function and the frequency response characteristic is performed, the frequency response characteristic can be calculated from the transfer function and the arithmetic operation can be performed in a manner as in the above embodiment. Additionally, in the arithmetic operations, there is an arithmetic operation on only the transfer function, this arithmetic operation may be preformed in the transfer function. This can further reduce the processing load. Additionally, the frequency response characteristics used in various arithmetic operations are not limited to the frequency response characteristics (e.g., G21, G22, G33, G43 or the like) of the divided systems, but may include an operation result obtained by multiplication division in the frequency domain or an operation result obtained by addition subtraction in the time domain.

(3) In the above embodiment, the transfer function associated with transmission of force in response to application of an impact force to the measurement target object is estimated. In other embodiments, a transfer function associated with transmission of another physical quantity such as heat or the like may be estimated.

(4) The transfer function estimation method illustrated in the above embodiment is performed by the transfer function estimation apparatus 10. The transfer function estimation apparatus 10 may include a transfer function estimation program for executing a procedure of the transfer function estimation method as a software procedure. The transfer function estimation program may be stored in a non-transitory computer readable storage medium. Alternatively, the transfer function estimation apparatus 10 may be configured to perform a part of the procedure of the transfer function estimation method by hardware.

According to the above embodiments, a transfer function estimation apparatus for estimating a transfer function of a measurement target object having a plurality of divided systems can be provided in various forms.

For example, the transfer function estimation apparatus may comprise comprises an estimation equation acquisition section, a frequency response characteristic acquisition section, a four arithmetic operation determination section, a multiplication-division section, a conversion section, an addition-subtraction section and a reconversion section. The estimation equation acquisition section acquires an estimation equation to estimate the transfer function of the measurement target object, where the transfer function of the measurement target object is determined in accordance with the number of divided systems of the measurement target object and a connection form of the divided systems of the measurement target object. The frequency response characteristic acquisition section acquires frequency response characteristics which are data in a frequency domain and which include gain and phase associated with input to and output from the measurement target object. The four arithmetic operation determination section determines, for each arithmetic operation in the estimation equation, whether the arithmetic operation is an addition-subtraction or a multiplication-division. When the four arithmetic operation determination section determines that the arithmetic operation is the multiplication-division, the multiplication-division section performs the multiplication-division of the frequency response characteristics in the frequency domain. When the four arithmetic operation determination section determines that the arithmetic operation is the addition-subtraction, the conversion section converts the frequency response characteristics, which are targeted for the addition-subtraction, into time response characteristics to thereby calculate the time response characteristics, which are data in a time domain. The addition-subtraction section performs the addition-subtraction of the time response characteristics in the time domain. Thereafter, the reconversion section reconverts a result of the addition-subtraction performed by the addition-subtraction section into the frequency domain.

In the above transfer function estimation apparatus, the conversion section may include: a trigonometric function calculation section that, at predetermined frequency intervals, calculates, as a time response, a trigonometric function that is based on the gain and the phase; and an adding section that calculates the time response characteristics by adding the time responses at all frequencies calculated by the trigonometric function calculation section.

The above transfer function estimation may further comprise: a virtual input waveform acquisition section that acquires a virtual input gain and a virtual input phase of a virtual input waveform that are used for converting the frequency response characteristic into the time domain; a correction section that corrects the frequency response characteristic by using the virtual input gain and the virtual input phase, thereby providing a corrected gain and a corrected phase; and a recorrection section that recorrects, by using the virtual input gain and the virtual input phase, the result of the addition-subtraction reconverted into the frequency domain by the reconversion section. The trigonometric function calculation section may calculate, as the time response, a trigonometric function that is based on the corrected gain and the corrected phase provided by the correction section.

In the transfer function estimation apparatus according to claim 1, the frequency response characteristics acquired by the frequency response characteristic acquisition section may include: an in-divided-system response characteristic associated with a physical quantity transmitted to an output point of each divided system in response to input of a force to an input point of the each divided system; and a node frequency response characteristic associated with a physical quantity transmitted to a connection point between one divided system and another divided system in response to input of a force to the connection point.

In another embodiment, a transfer function estimation method for estimating a transfer function of a measurement target object having a plurality of divided systems is provided. The transfer function estimation method may comprise: acquiring an estimation equation to estimate the transfer function of the measurement target object, the transfer function being determined in accordance with the number of divided systems of the measurement target object and a connection manner of the divided systems of the measurement target object; acquiring frequency response characteristics which are data in a frequency domain and which include gain and phase associated with input to and output from the measurement target object; determining, for each arithmetic operation in the estimation equation, whether the arithmetic operation is an addition-subtraction or a multiplication-division; in cases where it is determined that the arithmetic operation is the multiplication-division, performing the multiplication-division of the frequency response characteristics in the frequency domain; in cases where it is determined that the arithmetic operation is the addition-subtraction, converting the frequency response characteristics, which are targeted for the addition-subtraction, into time response characteristics, thereby calculating the time response characteristics, which are data in a time domain; performing the addition-subtraction of the time response characteristics in the time domain; and reconverting a result of the addition-subtraction into the frequency domain.

In yet another embodiment, a non-transitory computer readable storage medium storing a computer-executable program that causes a computer to execute the above transfer function estimation method can be provided.

Embodiments of the present disclosure is not limited the above embodiments and modifications. That is, the above embodiments and modifications thereof may be modified or combined in various ways without departing from the sprit and scope of the present disclosure.

What is claimed is:

1. A transfer function estimation apparatus for estimating a transfer function of a measurement target object having a plurality of divided systems, the transfer function estimation apparatus comprising:
an estimation equation acquisition section that acquires an estimation equation to estimate the transfer function of the measurement target object determined in accordance with the number of divided systems of the measurement target object and a connection form of the divided systems of the measurement target object;
a frequency response characteristic acquisition section that acquires frequency response characteristics which are obtained by converting acceleration data into data in a frequency domain, wherein the acceleration data are data of acceleration that is output from a predetermined output point of the measurement target object in response to input of an impact force to a predetermined input point of the measurement target object, wherein the frequency response characteristics include gain and phase associated with the input to and the output from the measurement target object;
a four arithmetic operation determination section that determines, using a computer processor, for each arithmetic operation in the estimation equation, whether the arithmetic operation is an addition-subtraction or a multiplication-division;
a multiplication-division section that,
in cases where the four arithmetic operation determination section determines that the arithmetic operation is the multiplication-division,
performs the multiplication-division of the frequency response characteristics in the frequency domain;
a conversion section that,
in cases where the four arithmetic operation determination section determines that the arithmetic operation is the addition-subtraction,
converts the frequency response characteristics, which are targeted for the addition-subtraction, into time response characteristics to thereby calculate the time response characteristics, which are data in a time domain;
an addition-subtraction section that performs the addition-subtraction of the time response characteristics in the time domain; and
a reconversion section that reconverts a result of the addition-subtraction performed by the addition-subtraction section into the frequency domain.

2. The transfer function estimation apparatus according to claim 1, wherein:
the conversion section includes
a trigonometric function calculation section that, at predetermined frequency intervals, calculates, as a time response, a trigonometric function that is based on the gain and the phase, and
an adding section that calculates the time response characteristics by adding the time responses at all frequencies calculated by the trigonometric function calculation section.

3. The transfer function estimation apparatus according to claim 2, further comprising:
a virtual input waveform acquisition section that acquires a virtual input gain and a virtual input phase of a virtual input waveform that are used for converting the frequency response characteristic into the time domain;
a correction section that corrects the frequency response characteristic by using the virtual input gain and the virtual input phase, thereby providing a corrected gain and a corrected phase; and
a recorrection section that recorrects, by using the virtual input gain and the virtual input phase, the result of the addition-subtraction reconverted into the frequency domain by the reconversion section,
wherein:
the trigonometric function calculation section calculates, as the time response, a trigonometric function that is based on the corrected gain and the corrected phase provided by the correction section.

4. The transfer function estimation apparatus according to claim 1, wherein:
the frequency response characteristics acquired by the frequency response characteristic acquisition section include:
an in-divided-system response characteristic associated with a physical quantity transmitted to an output point of each divided system in response to input of a force to an input point of the each divided system; and
a node frequency response characteristic associated with a physical quantity transmitted to a connection point between one divided system and another divided system in response to input of a force to the connection point.

5. The transfer function estimation apparatus according to claim 1, wherein the transfer function estimation apparatus is configured to perform sound or vibration simulation of the measurement target object.

6. The transfer function estimation method according to claim 1, further comprising performing sound or vibration simulation of the measurement target object.

7. A transfer function estimation method for estimating a transfer function of a measurement target object having a plurality of divided systems, the transfer function estimation method comprising:
acquiring an estimation equation to estimate the transfer function of the measurement target object, the transfer function being determined in accordance with the number of divided systems of the measurement target object and a connection manner of the divided systems of the measurement target object;

acquiring frequency response characteristics which are obtained by converting acceleration data into data in a frequency domain, wherein the acceleration data are data of acceleration that is output from a predetermined output point of the measurement target object in response to input of an impact force to a predetermined input point of the measurement target object, wherein the frequency response characteristics include gain and phase associated with the input to and the output from the measurement target object;

determining, using a computer processor, for each arithmetic operation in the estimation equation, whether the arithmetic operation is an addition-subtraction or a multiplication-division;

in cases where it is determined that the arithmetic operation is the multiplication-division, performing the multiplication-division of the frequency response characteristics in the frequency domain;

in cases where it is determined that the arithmetic operation is the addition-subtraction, converting the frequency response characteristics, which are targeted for the addition-subtraction, into time response characteristics, thereby calculating the time response characteristics, which are data in a time domain;

performing the addition-subtraction of the time response characteristics in the time domain; and reconverting a result of the addition-subtraction into the frequency domain.

8. A non-transitory computer readable storage medium storing a computer-executable program that causes a computer to execute the transfer function estimation method recited in claim 7.

\* \* \* \* \*